United States Patent
Kras et al.

(10) Patent No.: US 12,177,252 B2
(45) Date of Patent: *Dec. 24, 2024

(54) SYSTEMS AND METHODS FOR REPORTING BASED SIMULATED PHISHING CAMPAIGN

(71) Applicant: KnowBe4, Inc., Clearwater, FL (US)

(72) Inventors: Greg Kras, Dunedin, FL (US); Alin Irimie, Palm Harbor, FL (US)

(73) Assignee: KnowBe4, Inc.

(*) Notice: Subject to any disclaimer, the term of this patent is extended or adjusted under 35 U.S.C. 154(b) by 0 days.

This patent is subject to a terminal disclaimer.

(21) Appl. No.: 18/124,984

(22) Filed: Mar. 22, 2023

(65) Prior Publication Data

US 2023/0247052 A1     Aug. 3, 2023

Related U.S. Application Data

(63) Continuation of application No. 17/233,269, filed on Apr. 16, 2021, now Pat. No. 11,641,375.

(Continued)

(51) Int. Cl.
*H04L 51/212*     (2022.01)
*H04L 9/40*       (2022.01)
(Continued)

(52) U.S. Cl.
CPC ........ *H04L 63/1491* (2013.01); *H04L 51/046* (2013.01); *H04L 51/212* (2022.05);
(Continued)

(58) Field of Classification Search
CPC . H04L 63/1491; H04L 51/12; H04L 63/1483; H04L 51/22; H04L 51/046; G09B 19/0053
See application file for complete search history.

(56) References Cited

U.S. PATENT DOCUMENTS 8,615,807 B1    12/2013   Higbee et al.
8,635,703 B1 *  1/2014    Belani ............... H04L 63/1483
                                                          726/25
(Continued)

FOREIGN PATENT DOCUMENTS

EP    3 343 870 A1    7/2018
EP    3 582 468 A1    12/2019
(Continued)

OTHER PUBLICATIONS

Final Office Action on U.S. Appl. No. 17/233,269 dated Jul. 13, 2022 (14 Pages).

(Continued)

*Primary Examiner* — Aftab N. Khan
(74) *Attorney, Agent, or Firm* — Foley & Lardner LLP

(57) ABSTRACT

Systems and methods are described for leveraging the knowledge and security awareness of well-informed users in an organization to protect other users and train them to identify new phishing attacks. Initially, a report of a message being suspicious may be identified and it may be determined whether message is a malicious phishing message. In an example, a well-informed user of an organization may report the message as suspicious. Further, on determining the message to be a malicious phishing message, a simulated phishing message or a template may be created. The simulated phishing message may then be communicated to one or more devices of one or more users.

18 Claims, 9 Drawing Sheets

Related U.S. Application Data

(60) Provisional application No. 63/017,398, filed on Apr. 29, 2020.

(51) Int. Cl.
 *H04L 51/046* (2022.01)
 *H04L 51/42* (2022.01)
 *G09B 19/00* (2006.01)

(52) U.S. Cl.
 CPC .......... *H04L 51/42* (2022.05); *H04L 63/1483* (2013.01); *G09B 19/0053* (2013.01)

(56) References Cited

U.S. PATENT DOCUMENTS

| | | | |
|---|---|---|---|
| 8,719,940 | B1 | 5/2014 | Higbee et al. |
| 8,910,287 | B1 | 12/2014 | Belani et al. |
| 8,966,637 | B2 | 2/2015 | Belani et al. |
| 9,053,326 | B2 | 6/2015 | Higbee et al. |
| 9,246,936 | B1 | 1/2016 | Belani et al. |
| 9,253,207 | B2 | 2/2016 | Higbee et al. |
| 9,262,629 | B2 | 2/2016 | Belani et al. |
| 9,325,730 | B2 | 4/2016 | Higbee et al. |
| 9,356,948 | B2 | 5/2016 | Higbee et al. |
| 9,398,038 | B2 | 7/2016 | Higbee et al. |
| 9,591,017 | B1 | 3/2017 | Higbee et al. |
| 9,667,645 | B1 | 5/2017 | Belani et al. |
| 9,876,753 | B1 | 1/2018 | Hawthorn |
| 9,912,687 | B1 | 3/2018 | Wescoe et al. |
| 10,243,904 | B1 | 3/2019 | Wescoe et al. |
| 10,601,865 | B1* | 3/2020 | Mesdaq .............. H04L 63/1425 |
| 10,764,313 | B1* | 9/2020 | Mushtaq ................ G06N 20/00 |
| 10,834,128 | B1* | 11/2020 | Rajagopalan ......... H04L 51/212 |
| 10,904,186 | B1 | 1/2021 | Everton et al. |
| 10,986,122 | B2 | 4/2021 | Bloxham et al. |
| 11,032,312 | B2* | 6/2021 | Jeyakumar ............ G06F 16/353 |
| 11,044,267 | B2 | 6/2021 | Jakobsson et al. |
| 11,184,393 | B1 | 11/2021 | Gendre et al. |
| 11,297,094 | B2 | 4/2022 | Huda |
| 11,818,094 | B1* | 11/2023 | Joyner ................ H04L 61/5061 |
| 2006/0101334 | A1* | 5/2006 | Liao ........................ H04L 51/18 715/205 |
| 2007/0083929 | A1* | 4/2007 | Sprosts ................ H04L 63/123 713/188 |
| 2015/0229664 | A1 | 8/2015 | Hawthorn et al. |
| 2016/0164898 | A1 | 6/2016 | Belani et al. |
| 2016/0301705 | A1 | 10/2016 | Higbee et al. |
| 2016/0301716 | A1* | 10/2016 | Sadeh-Koniecpol .................. G06F 21/567 |
| 2017/0237776 | A1* | 8/2017 | Higbee ............... H04L 63/1433 726/1 |
| 2019/0171934 | A1* | 6/2019 | Sites .................... H04L 63/0227 |
| 2019/0173819 | A1 | 6/2019 | Wescoe et al. |
| 2019/0215335 | A1 | 7/2019 | Benishti |
| 2019/0245885 | A1 | 8/2019 | Starink et al. |
| 2019/0245894 | A1 | 8/2019 | Epple et al. |
| 2019/0318653 | A1 | 10/2019 | Shi |
| 2020/0021620 | A1 | 1/2020 | Purathepparambil et al. |
| 2020/0036750 | A1 | 1/2020 | Bahnsen et al. |
| 2020/0053114 | A1 | 2/2020 | Shabtai et al. |
| 2020/0311260 | A1 | 10/2020 | Klonowski et al. |
| 2021/0185075 | A1 | 6/2021 | Adams |
| 2021/0194924 | A1 | 6/2021 | Heinemeyer et al. |
| 2021/0407308 | A1 | 12/2021 | Brubaker et al. |
| 2022/0005373 | A1 | 1/2022 | Nelson et al. |
| 2022/0006830 | A1 | 1/2022 | Wescoe |
| 2022/0078207 | A1 | 3/2022 | Chang et al. |
| 2022/0094702 | A1 | 3/2022 | Saad Ahmed et al. |
| 2022/0100332 | A1 | 3/2022 | Haworth et al. |
| 2022/0116419 | A1 | 4/2022 | Kelm et al. |
| 2022/0130274 | A1 | 4/2022 | Krishna Raju et al. |
| 2022/0286419 | A1 | 9/2022 | Stetzer et al. |

FOREIGN PATENT DOCUMENTS

| | | |
|---|---|---|
| WO | WO-2016/164844 A1 | 10/2016 |
| WO | WO-2019/207574 A1 | 10/2019 |

OTHER PUBLICATIONS

Final Office Action on U.S. Appl. No. 17/233,269 dated Oct. 6, 2021 (12 Pages).
International Preliminary Report on Patentability on PCT Appl. Ser. No. PCT/US2021/027819 dated Nov. 10, 2022 (8 Pages).
International Search Report on PCT PCT/US2021/027819 dated Aug. 3, 2021 (14 Pages).
Non-Final Office Action on U.S. Appl. No. 17/233,269 dated Mar. 3, 2022 (13 Pages).
Notice of Allowance on U.S. Appl. No. 17/233,269 DTD Feb. 24, 2023.
US Office Action on U.S. Appl. No. 17/233,269 dated Jun. 6, 2021 (9 Pages).
Foreign Action other than Search Report on EP DTD Aug. 21, 2023.

\* cited by examiner

SYSTEMS AND METHODS FOR REPORTING BASED SIMULATED PHISHING CAMPAIGN

CROSS-REFERENCE TO RELATED APPLICATION

This application is a continuation of and claims priority to and the benefit of U.S. patent application Ser. No. 17/233,269, titled "SYSTEMS AND METHODS FOR REPORTING BASED SIMULATED PHISHING CAMPAIGN," and filed on Apr. 16, 2021, which claims priority to and the benefit of U.S. Patent Application No. 63/017,398, titled "SYSTEMS AND METHODS FOR REPORTING BASED SIMULATED PHISHING CAMPAIGN," and filed on Apr. 29, 2020, the contents of all of which are hereby incorporated herein by reference in its entirety for all purposes.

TECHNICAL FIELD

The present invention generally relates to systems and methods for reporting based simulated phishing campaigns and particularly for leveraging user reporting of phishing emails to protect an organization and train other users in identifying new phishing attacks.

BACKGROUND

Phishing attacks are one of the most common security challenges that both individuals and organizations face in keeping their confidential information secure. Phishing attacks exploit human behavior through deception to gain access to organizational systems and personal information of users through electronic means. A phishing attack involves an attempt to acquire sensitive information such as login credentials, bank account information, credit card details, personal data, organization's confidential data, etc., often for malicious reasons, possibly by masquerading as a trustworthy entity. One of the common types of phishing is email phishing. Email phishing involves targeting one or more employees of an organization with malicious intent including covert collection of confidential data. The email phishing involves having message content that appears genuine, personal, or believable and may convince the user to act upon it. A typical phishing email may include a link and/or an attachment of malicious nature. The link when accessed may lead to a webpage that performs malicious actions or tricks the user to provide sensitive information or execute a malicious program. Similarly, the attachment when accessed, may execute a program that performs malicious actions. Malicious actions may be malicious data collection or actions harmful to the normal functioning of a device on which the email content was activated, or any other malicious actions capable of being performed by a program or a set of programs.

Organizations have recognized phishing as one of the most prominent threats that can cause a serious breach of data including confidential information. Attackers who launch phishing attacks may attempt to evade an organization's security controls and target its employees. To prevent or to reduce the success rate of phishing attacks on employees, security-conscious organizations may conduct phishing awareness training programs for their employees, along with other security measures. Through the phishing awareness training, the organizations actively educate their employees on how to spot and report a suspected phishing attack. As a part of a phishing awareness training program, an organization may send out simulated phishing emails periodically or occasionally to the devices of the employees and observe responses of the employees to such emails. A simulated phishing email is intended to resemble a real phishing email. The more genuine the simulated phishing email appears, the more likely an employee would respond to it.

It is common that, organizations may implement anti-phishing mechanisms to identify and stop phishing attacks even before the phishing emails reach the users. These anti-phishing mechanisms may rely on a database of signatures to stop malware associated with phishing attacks. The signatures may include a blacklist of Uniform Resource Locators (URLs), a set of behavior profiles, and a set of social graphs that can be used to identify suspicious behavior or entities. However, phishing emails having new signatures or involving new techniques may evade the anti-phishing mechanisms and may reach the users. Currently, organizations do not have mechanisms to train their employees for such new attacks. A new attack that is not known in advance or reported is called a zero-day attack. The term zero-day may refer to an attack that has zero days between the time the attack is discovered and the first attack. Zero-day attacks tend to be very difficult to detect. The length of time for a signature to be released for a piece of malware may be 24 to 48 hours, whereas the first victim of a phishing attack may happen within minutes of its release. This renders the anti-phishing software systems defenseless against a phishing attack until a signature is developed and deployed against the phishing attack. Therefore, existing anti-phishing software systems and other signature-based systems are ineffective for zero-day attacks as no signatures yet exist for such attacks. Consequently, the organization may be at a security risk until signatures are developed and deployed for the zero-day attacks. This may possibly lead to breach of the sensitive information of the organization.

SUMMARY

Systems and methods are described for leveraging the knowledge and security awareness of well-informed users in an organization to protect the organization from, and train other users to identify, new phishing attacks.

Systems and methods are provided for using a reported suspicious message to create a simulated phishing message. In an example embodiment, a method for using a reported suspicious message to create a simulated phishing message is described which includes, identifying, by one or more processors, a report of a message being suspicious; determining, by the one or more processors, that the message is a malicious phishing message; creating, by the one or more processors responsive to the determination and based at least on the message, a simulated phishing message or a template to create the simulated phishing message; communicating, by the one or more processors, the simulated phishing message to one or more devices of one or more users.

In some implementations, the method further includes receiving, a forward of the email identified as potentially malicious.

In some implementations, the method further includes identifying, the email being suspicious in a mailbox of the one or more users.

In some implementations, the method further includes determining, that the email is a malicious phishing email using a rule set of one or more characteristic detection rules.

In some implementations, the method further includes removing, one or more malicious elements of the message to create the simulated phishing message or the template for the simulated phishing message.

In some implementations, the method further includes modifying, one or more malicious elements of the message to create the simulated phishing message or the template for the simulated phishing message.

In some implementations, the method further modifying, one or more links of the message to create the simulated phishing message or the template for the simulated phishing message to include one or more links to training content when interacted with by a user.

In some implementations, the method further includes comprising creating, the template to be customizable to include one of a specific user reference or content.

In some implementations, the method further includes causing, the message in a messaging application of a user to be replaced with the simulated phishing message.

In some implementations, the method further includes causing, the simulated phishing message to be moved from one of a delete or trash folder of the messaging application of the user to an inbox of the messaging application.

In another example embodiment, for using a reported suspicious message to create a simulated phishing message is described. The system includes one or more processors, coupled to memory, and configured to: identify a report of a message being suspicious; determine that the message is a malicious phishing message; create, responsive to the determination and based at least on the message, a simulated phishing message or a template to create the simulated phishing message; and communicate the simulated phishing message to one or more devices of one or more users.

In some implementations, the one or more processors are further configured to receive a forward of the email identified as potentially malicious.

In some implementations, the one or more processors are further configured to identify the email being suspicious in a mailbox of the one or more users.

In some implementations, the one or more processors are further configured to determine that the email is a malicious phishing email using a rule set of one or more characteristic detection rules.

In some implementations, the one or more processors are further configured to remove one or more malicious elements of the message to create the simulated phishing message or the template for the simulated phishing message.

In some implementations, the one or more processors are further configured to modify one or more malicious elements of the message to create the simulated phishing message or the template for the simulated phishing message.

In some implementations, the one or more processors are further configured to modify one or more links of the message to create the simulated phishing message or the template for the simulated phishing message to include one or more links to training content when interacted with by a user.

In some implementations, the one or more processors are further configured to create the template to be customizable to include one of a specific user reference or content.

In some implementations, the one or more processors are further configured to cause the message in a messaging application of a user to be replaced with the simulated phishing message.

In some implementations, the one or more processors are further configured to cause the simulated phishing message to be moved from one of a delete or trash folder of the messaging application of the user to an inbox of the messaging application.

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for leveraging the knowledge and security awareness of well-informed users in an organization to protect other users from and train them to identify new phishing attacks.

A. Computing and Network Environment

Figure 1A:
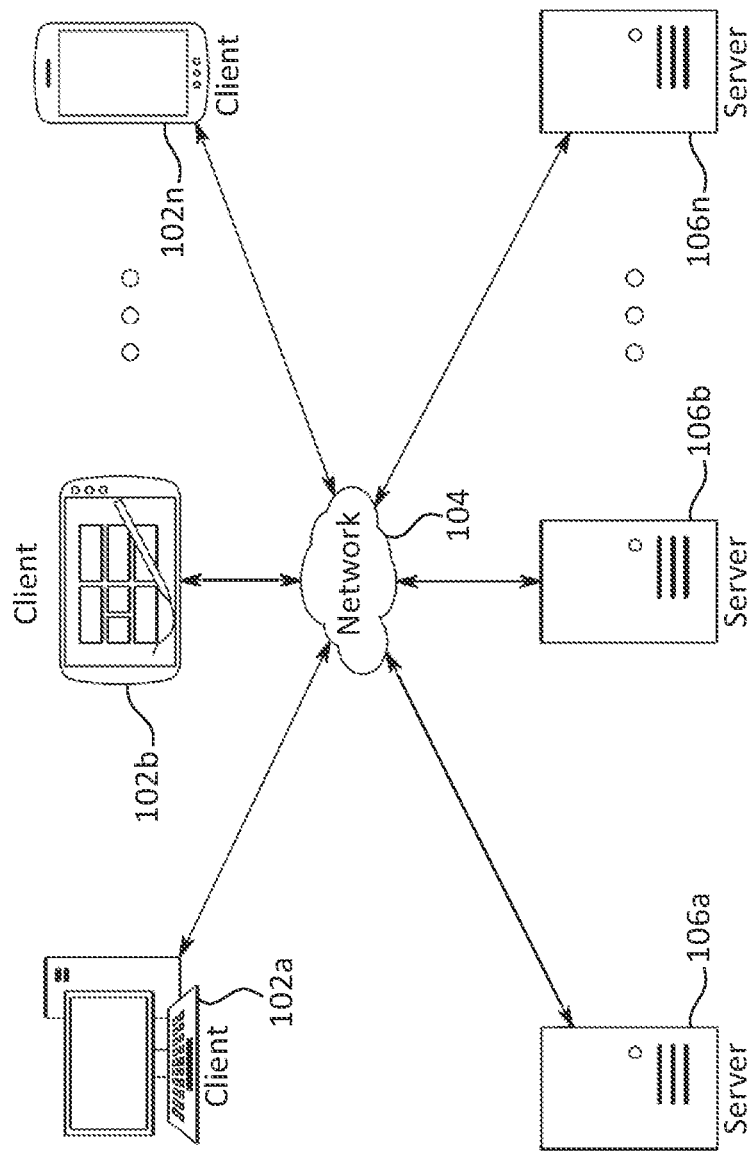
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s)

102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
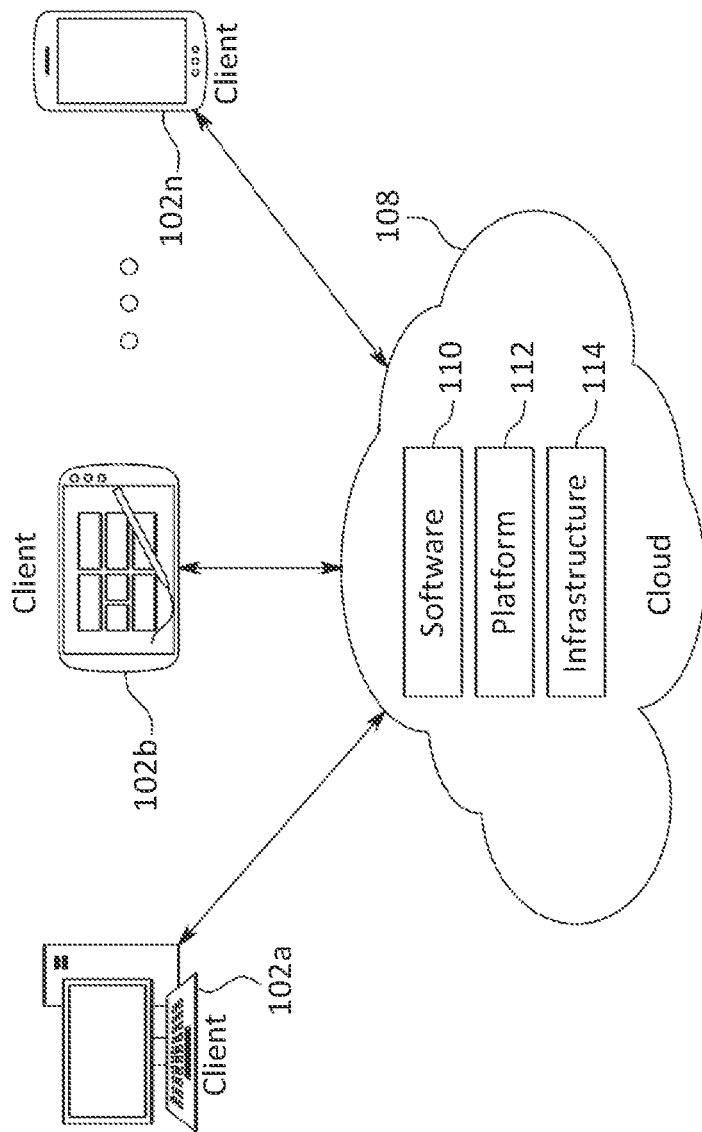
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
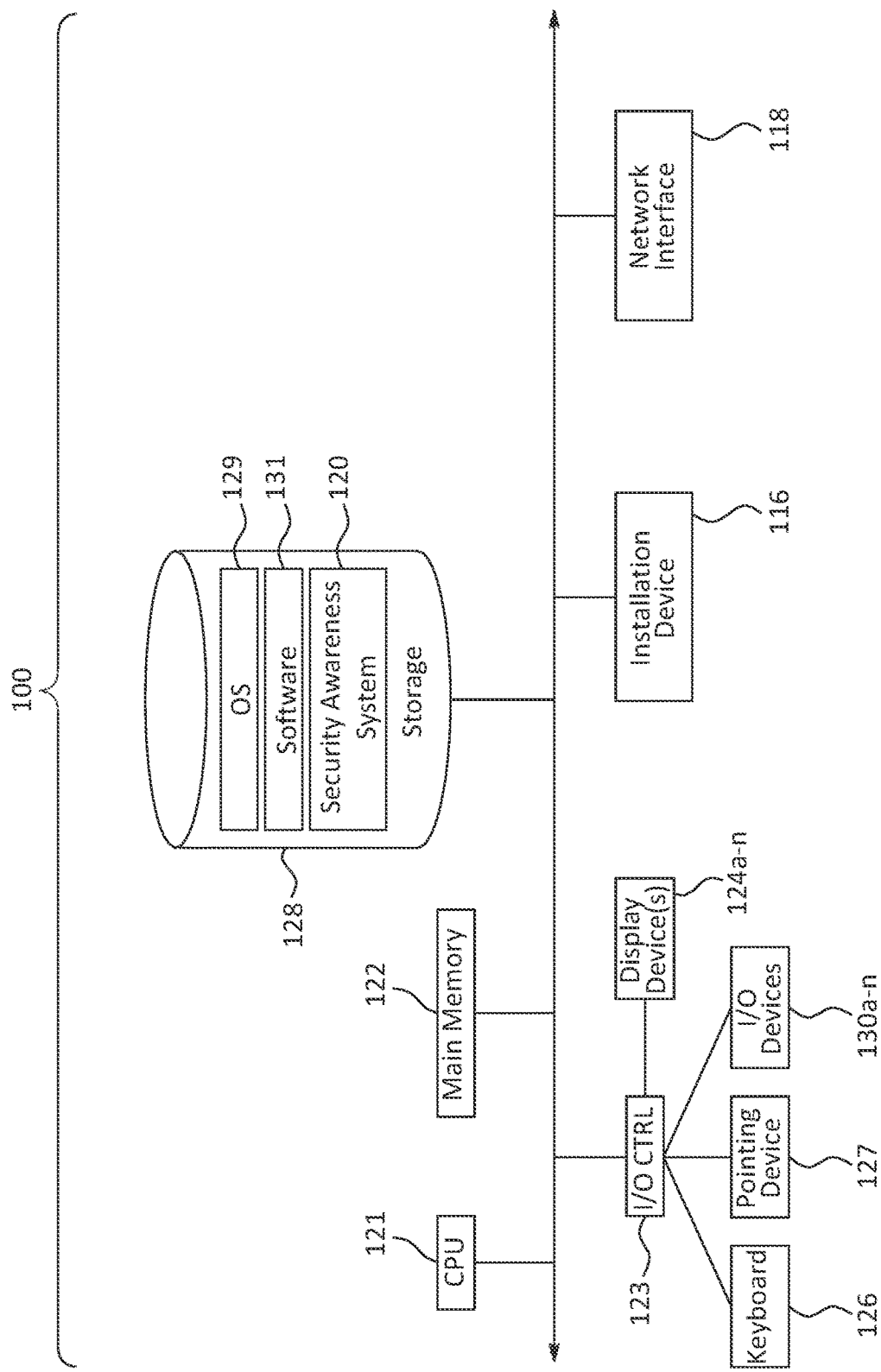
FIGS. 1C and 1D are block diagrams depicting embodiments of computing devices useful in connection with the methods and systems described herein, according to some embodiments.
Figure 1D:
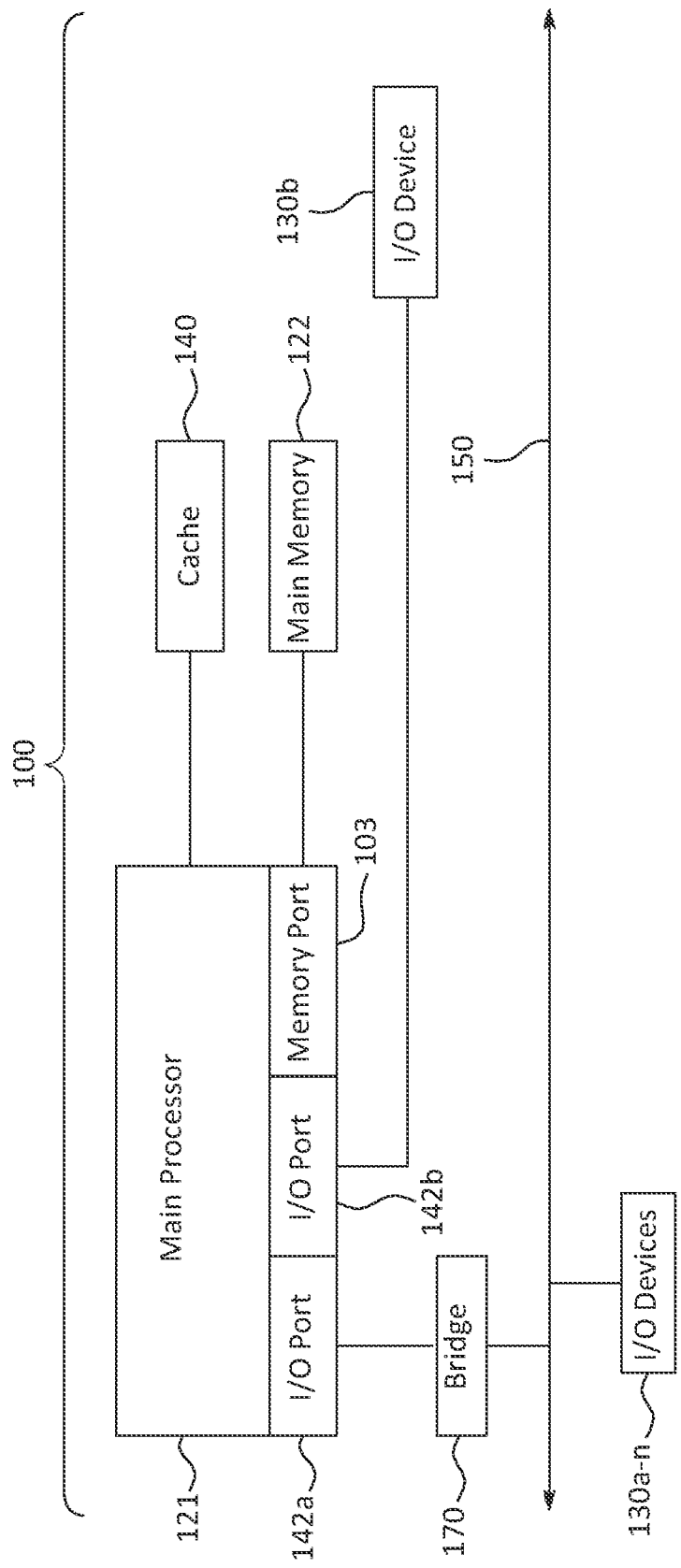

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of a security awareness system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WIN- DOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Washington. In other embodiments, computing device 100 is an eBook reader, e.g. the KINDLE family of devices by Amazon.com, or NOOK family of devices by Barnes & Noble, Inc. of New York City, New York.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Reporting Based Simulated Phishing Campaign

The following describes systems and methods for leveraging the knowledge and security awareness of one or more well-informed users in an organization to protect the organization from, and train them other users to identify and report, zero-day attacks or new phishing attacks. Users and employees are the last line of defense for an organization when electronic systems to prevent malicious attacks have been circumvented or been ineffective. A well-informed user may be understood as a person who has a good cyber security awareness and maintains a high security awareness standard. In one example, the well-informed user may be an Information Technology (IT) supervisor of the organization. In another example, the well-informed user may be an office administrator of the organization. Further, since the well-informed user has a high security awareness standard, the well-informed user may be an important defense for any new phishing attack. In an example, a new phishing attack may be a zero-day attack that is not known in advance or reported as of yet. The term zero-day may refer to a phishing attack that has zero days between the time the attack is discovered and the first attack.

The systems and the methods of the present disclosure provide for creation of a simulated phishing message using a reported suspicious message. In some embodiments, the systems and the methods may provide one or more options for the users of the organization to report a suspicious message that the user received at his or her mailbox. The user may select the one or more options to report the suspicious message as a phishing attack (for example, a new phishing attack or a zero-day attack) or a threat to the organization. In an example, the user may select to report the suspicious message via a plug-in integrated into an email client. In some embodiments reporting via the email client plug-in may cause the suspicious message to be sent to a threat detection system for further analysis. In another example, the user may report the suspicious message as potentially malicious by forwarding the suspicious message to a security contact point of the organization. Other examples of reporting the suspicious message are contemplated herein. In an example, the security contact point may refer to any person from an Information Technology (IT) department or a cyber security team or a third party that manages cyber security of the organization. In response to receiving the reported message (suspicious message), the security contact point may send the reported message to a threat detection system for further analysis. In some embodiments, the threat detection system may retrieve the reported message from the security contact point on notification of such reporting.

The threat detection system may evaluate the reported message to determine whether the reported message is a malicious phishing message. The threat detection system may use various known and proprietary techniques to determine whether the reported message is a malicious phishing message. On determining the reported message to be a malicious phishing message, the threat detection system may update the reported message by inoculating one or more malicious elements of the message. The malicious elements of the message may include one or more of Uniform Resource Locators (URLs), attachments, macros, etc.

The systems and the methods of the present disclosure leverage the security awareness system to create a simulated phishing message or a template to create the simulated phishing message using the determined/identified malicious phishing message. The template may enable user-centric customizations of the simulated phishing message to target a specific user or a set of users. In an example, the security awareness system may replace or alter the inoculate malicious elements (for example URLs, attachments, macros, etc.) of the malicious phishing message with one or more benign elements to create the simulated phishing message. In an example, benign elements of a simulated phishing message may mimic characteristics of malicious elements. That is, the benign elements may maintain the same look and feel as the malicious elements, but do not cause any harm to the user or the organization. Instead, the benign elements may test the user's security awareness levels. Based on the user's interaction/reaction or response to the benign elements, the security awareness system may determine security awareness training requirements for the user. The benign elements may include one or more of URLs, attachments, macros, etc. Thus, the simulated phishing message may be understood as a message, similar to a malicious message in which malicious elements have been neutralized, removed or replaced with benign elements for the purpose of determining security awareness level of the user, and to impart security awareness training to improve the level of security awareness of the user.

The security awareness system may execute a simulated phishing attack or a simulated phishing campaign based on the reported malicious phishing message. The simulated phishing campaign may, for example, target a group of users, such as employees of a business unit of the organization in order to test and develop cybersecurity awareness. The simulated phishing campaign may be carried out for specific purposes including giving enhanced training to more vulnerable groups in the organization. In an example, the security awareness system may initiate the simulated phishing campaign based on communicating the simulated phishing message to mailboxes of the target group of users or all users of the organization. The simulated phishing message will serve a purpose of training for the users to recognize the new phishing attack (zero-day attack), and also to gauge the security awareness of the users who interact with the benign elements for further security awareness training. In an example, the simulated phishing message that has been developed using an actual phishing attack message (that was reported by the well-informed user) allows other users in the organization to be specifically trained to recognize and report new phishing attacks. The users being trained immediately about the new phishing attack would provide significant risk mitigation for the organization until a signature is developed for this specific phishing attack. As a result, the organization is effectively inoculated against the threat of the new phishing attack and a risk of damage to the organization is minimized.

Further, the systems and the methods of the present disclosure provide for the organization to track how often the organization is able to train the users of the organization with the simulated phishing message based on the reported new phishing attack (malicious phishing message). For example, an organization may define various metric such as "Actual Threat Minimized" which may provide an indication of percentage of simulated phishing messages that are made from actual malicious phishing messages that are reported.

Figure 2A:
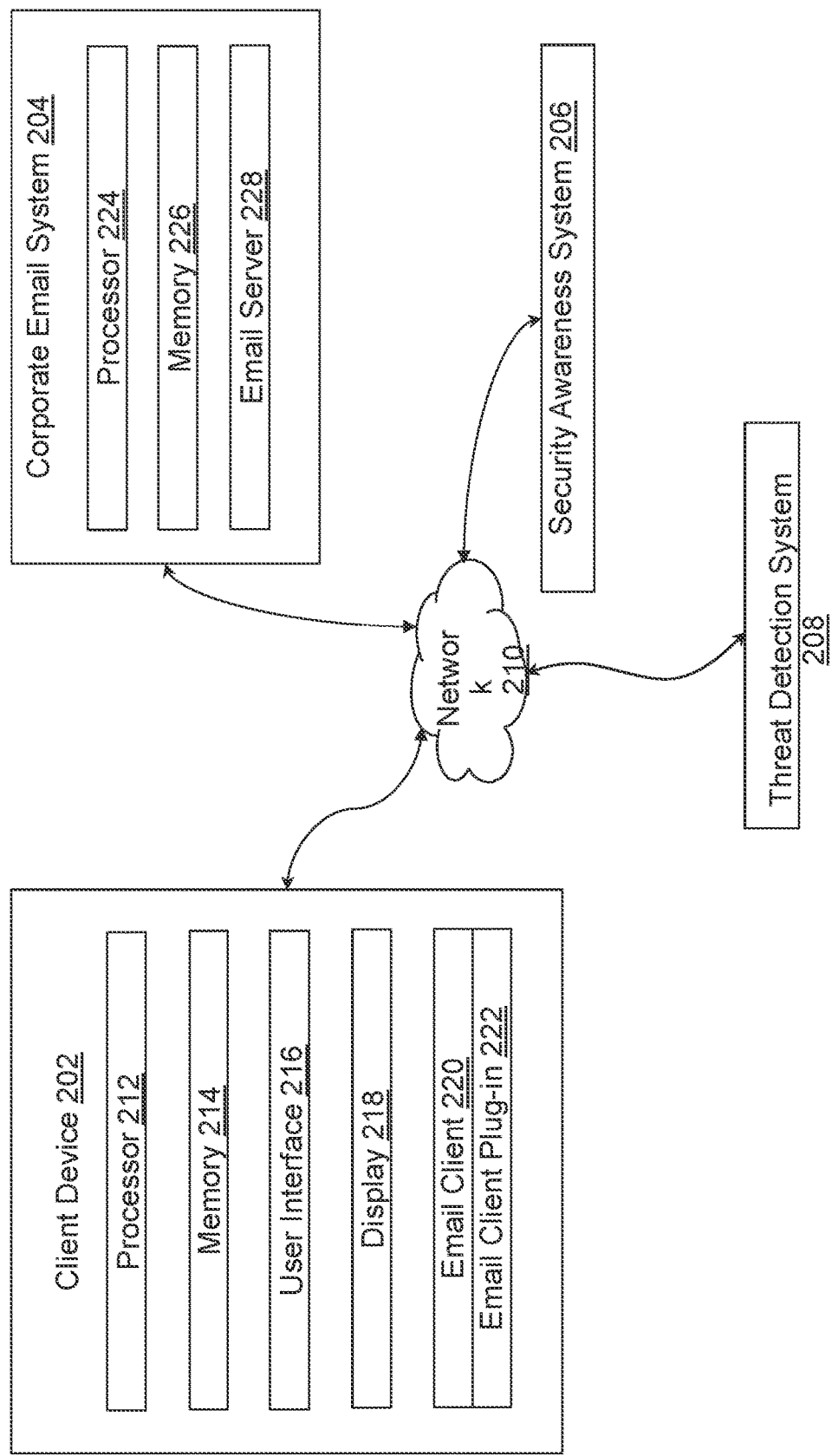
FIG. 2A depicts an implementation of some of the architecture of a system for reporting a suspicious message, according to some embodiments.

FIG. 2A depicts an implementation of some of an architecture of system 200 for reporting a suspicious message, according to some embodiments. The system 200 may leverage knowledge and security awareness of most-informed or well-informed users in an organization to educate other users of new phishing attacks.

System 200 may include client device 202, corporate email system 204, security awareness system 206, threat detection system 208, and network 210 enabling communication between the system components. Network 210 may be an example or instance of network 104, details of which are provided with reference to FIG. 1A and its accompanying description.

In some embodiments, client device 202 may be any user-end device used by a user. The user may be an employee of an organization or any entity. Client device 202 as disclosed, may be any computing device, such as a desktop computer, a laptop, a tablet computer, a mobile device, a Personal Digital Assistant (PDA) or any other computing device. In an implementation, client device 202 may be a device, such as client device 102 shown in FIGS. 1A and 1B. Client device 202 may be implemented by a device, such as computing device 100 shown in FIGS. 1C and 1D.

According to some embodiment, client device 202 may include processor 212, and memory 214. In an example, processor 212 and memory 214 of client device 202 may be CPU 121 and main memory 122, respectively, as shown in FIGS. 1C and 1D. Client device 202 may also include user interface 216 such as a keyboard, a mouse, a touch screen, a haptic sensor, voice-based input unit, or any other appropriate user interface. It shall be appreciated that such components of client device 202 may correspond to similar components of computing device 100 in FIGS. 1C and 1D, such as keyboard 126, pointing device 127, I/O devices 130*a-n* and display devices 124*a-n*. The client device 202 may also include display 218, such as a screen, a monitor connected to the device in any manner, or any other appropriate display. In an implementation, client device 202 may display a received message for the user using display 218 and is able to accept user interaction via user interface 216 responsive to the displayed message.

Referring again to FIG. 2A, in some embodiments, client device 202 may include email client 220. In one example implementation, email client 220 may be an application installed on client device 202. In another example implementation, email client 220 may be an application that can be accessed over network 210 through a browser without requiring to be installed on client device 202. In an implementation, email client 220 may be any application capable of composing, sending, receiving, and reading emails messages. For example, email client 220 may be an instance of an application, such as Microsoft Outlook™ application, Lotus Notes application, Apple Mail application, Gmail® application, or any other known or custom email application. In an implementation, email client 220 may be configured to receive messages from corporate email system 204. A message may be interchangeably referred to as an email or a message. In an example, a user of client device 202 may select, purchase and/or download email client 220, through for example, an application distribution platform. Note that as used herein, the term "application" may refer to one or more applications, services, routines, or other executable logic or instructions.

Email client 220 may include email client plug-in 222. In some implementations, email client plug-in 222 may not be implemented in email client 220 but may coordinate and communicate with email client 220. In some implementations, email client plug-in 222 is an interface local to email client 220 that enables email client users, i.e., recipients of messages, to select to report suspicious messages that they believe may be a threat to them or their organization. An email client plug-in may be an application program that may be added to an email client for providing one or more additional features which enables customization. The email client plug-in may be provided by the same entity that provides the email client software, or may be provided by a different entity. Based on usage types, email client plug-ins may be classified into different types. Such types may include for example plug-ins providing a User Interface (UI) element such as a button to trigger a function, and plug-ins that highlight portions of email to prompt a user to trigger a function. Functionality of email client plug-ins that use a UI button may be triggered when a user clicks the button. Some of the examples of email client plug-ins that use a button UI include but are not limited to, a Phish Alert Button (PAB) plug-in, a task create plug-in, a spam marking plug-in, an instant message plug-in and a search and highlight plug-in. In examples, a further type of email client plug-ins that highlight portions of email may scan the content of the email for specific content. In response to identifying the specific content, the email client plug-ins may highlight the specific content to prompt the user to trigger a function. In response to the user triggering the function, the function is executed to achieve an intended result. Examples of such email client plug-ins include a threat highlighter plug-in, a thesaurus lookup plug-in, a map plug-in, an action item creator plug-in, a meeting creator plug-in and an email alert plug-in. In an example of a map plug-in: when an email arrives, the map plug-in may analyze the content of the email to identify an address or location data in the email. The map plug-in communicates with the email client and uses the location data and highlights the address or location data for the attention of a user. When the user clicks on highlighted information, e.g., the address or location data, that information may be sent to a third-party map application to display the address or location on a map.

Referring back to FIG. 2A, email client plug-in 222 may be any of the aforementioned types, or may be of any other type. In one example, email client plug-in 222 may provide a PAB plug-in button through which function or capabilities of email client plug-in 222 is triggered by a user action on the button. Upon activation, email client plug-in 222 may forward the email to the security contact point. In other embodiments email client plug-in 222 may cause email client 220 to forward the message (suspicious message) or a copy of the message to threat detection system 208 for analysis and classification. In some embodiments, email client 220 or email client plug-in 222 may send a notification to security awareness system 206 that the user has reported the message received at the user's mailbox as potentially malicious. In another example, email client plug-in 222 may provide a highlighting feature which may highlight the email to be a phishing email. The user can click on the highlight which provides drop-down options (for example, through left or right mouse clicks) that enable the user to select and trigger a particular function or capability of email client plug-in 222. Other implementations of email client plug-in 222 not discussed here are contemplated herein. In one implementation, email client plug-in 222 may be implemented in email client 220. In some implementations, email client plug-in 222 may not be implemented in email client 220 but may coordinate and communicate with email client 220. Further, in an implementation, email client 220 may communicate with email client plug-in 222 over network 210.

According to an implementation, corporate email system 204 may be any email handling system owned or managed or otherwise associated with an organization or any entity authorized thereof. Corporate email system 204 may be implemented in a variety of computing systems, such as a mainframe computer, a server, a network server, a laptop computer, a desktop computer, a notebook, a workstation, and the like. In an implementation, corporate email system 204 may be communicatively coupled with client device 202, security awareness system 206, and threat detection system 208 through network 210 for exchanging information. In an implementation, corporate email system 204 may be implemented in a server, such as server 106 shown in FIG. 1A. In another implementation, corporate email system 204 may be implemented by a device, such as computing device 100 shown in FIGS. 1C and 1D. In an implementation, corporate email system 204 may be a system that is configured to receive, send, and/or relay outgoing messages between message senders (for example, third-party to an organization) and receivers (for example, client device 202).

Corporate email system 204 may further include processor 224, memory 226, and email server 228. For example, processor 224 and memory 226 of corporate email system 204 may be CPU 121 and main memory 122 respectively as shown in FIGS. 1C and 1D. In an implementation, email server 228 may be any server capable of handling and delivering email messages over network 210 using one or more standard email protocols, such as Post Office Protocol 3 (POP3), Internet Message Access Protocol (IMAP), Simple Message Transfer Protocol (SMTP), and Multipurpose Internet Mail Extension (MIME) Protocol. Email server 228 may be a standalone server or a part of an organization's server. Email server 228 may be implemented using, for example, Microsoft® Exchange Server, and HCL Domino®. In an implementation, email server 228 may be a server 106 shown in FIG. 1A. Email server 228 may be implemented by a device, such as computing device 100 shown in FIGS. 1C and 1D. Alternatively, email server 228 may be implemented as a part of a cluster of servers. In some embodiments, email server 228 may be implemented across a plurality of servers, thereby, tasks performed by email server 228 may be performed by the plurality of servers. These tasks may be allocated among the cluster of servers by an application, a service, a daemon, a routine, or other executable logic for task allocation.

Referring again to FIG. 2A, security awareness system 206 may be implemented in a variety of computing systems, such as a mainframe computer, a server, a network server, a laptop computer, a desktop computer, a notebook, a workstation, and the like. In an implementation, security awareness system 206 may be communicatively coupled with client device 202, corporate email system 204, and threat detection system 208 through network 210 for exchanging information. In an implementation, security awareness system 206 may be implemented in a server, such as server 106 shown in FIG. 1A. In another implementation security awareness system 206 may be implemented by a device, such as computing device 100 shown in FIGS. 1C and 1D. In an example, security awareness system 206 may be a Computer Based Security Awareness Training (CBSAT) system that performs security services such as performing simulated phishing attacks on a user or a set of users as a part of security awareness training.

According to some embodiments, threat detection system 208 may be implemented in a variety of computing systems, such as a mainframe computer, a server, a network server, a laptop computer, a desktop computer, a notebook, a workstation, and the like. In an implementation, threat detection system 208 may be communicatively coupled with client device 202, corporate email system 204, and security awareness system 206 through network 210 for exchanging information. In an implementation, threat detection system 208 may be implemented in a server, such as server 106 shown in FIG. 1A. In another implementation, threat detection system 208 may be implemented by a device, such as computing device 100 shown in FIGS. 1C and 1D. In an implementation, threat detection system 208 may be an electronic system for receiving messages that users have reported as suspicious or likely to be malicious. Further, threat detection system 208 may host applications that provide additional and/or custom features to client device 202. In an implementation, threat detection system 208 may communicate with email client plug-in 222 to provide additional and/or custom features to client device 202. In some implementations, email client plug-in 222 may be provided to client device 202 by threat detection system 208. In other implementations, email client plug-in 222 may be provided to client device 202 by another entity, for example, email client plug-in 222 may be downloaded from another server.

In an implementation, security awareness system 206 and threat detection system 208 may communicate directly (via network 210) with client device 202. In some implementations, security awareness system 206 and threat detection system 208 may communicate with client device 202 through corporate email system 204. In an example, security awareness system 206 and threat detection system 208 may interact with corporate email system 204 in order to perform their functionalities (for example through it) including, but not limited to, receiving reported/forwarded messages, retracting malicious messages, adding benign elements in place of malicious elements, and linking the benign elements with a landing page or training materials. Although, security awareness system 206 and threat detection system 208 are shown as separate entities, security awareness system 206 and threat detection system 208 may be implemented as a single entity and managed by a third-party entity or the organization. In some embodiments, threat detection system 208 may be managed by a third-party entity and security awareness system 206 may be managed by the organization or vice-versa.

For an organization, users, such as their employees, are the an essential line of defense for any zero-day attack. The organization may rely on the users to report suspicious emails or messages quickly to mitigate any possibility of phishing attacks. In one embodiment, the organization may leverage savvy users or well-informed users in the organization who may quickly identify and report suspicious emails/messages.

In operation, a user of client device 202 may receive a message from a sender, such as a third-party, in his or her mailbox. In an implementation, the user may receive the message through email server 228 of corporate email system 204. The message may also be referred to as an email, an electronic message, or an electronic communication. In an example, the terms "message", "email", "electronic message", and "electronic communication" may be interchangeably used and are a non-limiting way to refer to any electronic communication. Further, the user may be any recipient of the message. In an example, the user may be an employee, a member, or an independent contractor for the organization. Also, in an example, the user may be a technically savvy or a well-informed employee of the organization who has a high level of security awareness.

On receiving the message, if the user suspects that the message is a malicious phishing message, the user may report the message using email client plug-in 222. For example, an accountant of the organization may receive a message that appears from a known client having a subject 'Statement of account' and includes a link to an external location in the message body. A user who is used to receiving messages with statements in the message body may find the message suspicious due to the presence of the link in the message body. Accordingly, the user who may be trained to spot phishing messages may identify the message to be a suspicious or possibly a phishing attack or a threat. In an example, the user may click on the PAB UI element using, for example, a mouse pointer to report the message. In another embodiment, the user may forward the message as potentially malicious to the security contact point.

In an implementation, when the user reports the message, email client plug-in 222 may receive an indication that the user has reported the message received at the user's mailbox or email account as potentially malicious. In response to receiving the indication that the user has reported the message as potentially malicious, email client plug-in 222 may cause email client 220 to forward the message (suspicious message) or a copy of the message to threat detection system 208 for analysis and classification. In some embodiments, email client 220 or email client plug-in 222 may send a notification to security awareness system 206 that the user has reported the message received at the user's mailbox as potentially malicious. In response, security awareness system 206 may retrieve the message (suspicious message) from the user's mailbox or threat detection system 208 for further processing. Various combinations of reporting, retrieving, and forwarding the message to threat detection system 208 are supported.

According to some embodiments, in addition to reporting the message using email client plug-in 222 or instead of reporting the message using email client plug-in 222, the user may forward the message as potentially malicious to a security contact point. Examples of the security contact point may include but are not limited to, a system administrator, a security manager, Information Technology (IT) manager, and the like. In some examples, a security workflow in an organization may include instructions that may include forwarding the message to the system administrator among other options to report when a user receives a suspicious message. Further, a record of an original recipient of the message may be captured in the message forwarded to the system administrator. In some implementations, the security contact point may encounter the message and determine the message to be malicious. In an implementation, the security contact point may forward the message (suspicious message) to threat detection system 208 for further processing. In some implementations, threat detection system 208 may retrieve the message from the security contact point. In examples, the security contact point may send or forward the suspicious or malicious message to security awareness system 206.

In an implementation, threat detection system 208 may process the reported message to detect/determine whether the reported message is a malicious phishing message. In some examples, threat detection system 208 may determine whether the reported message is a malicious phishing message using a rule set of one or more characteristic detection rules. Upon determining that the message is a malicious phishing message, threat detection system 208 may send or forward the malicious phishing message to security awareness system 206. As would be understood, the malicious phishing message may include malicious elements such links, attachments, macros, or any other kind of malicious elements. In some embodiments, after receiving the malicious phishing message, security awareness system 206 may modify, replace, alter, or remove one or more malicious elements of the malicious phishing message to create a simulated phishing message or a template for the simulated phishing message. In some embodiments, threat detection system 208 may modify, replace, alter, or remove one or more malicious elements from the malicious phishing message before sending it to security awareness system 206. Further example implementations of the manner in which threat detection system 208 may determine whether the reported message is a malicious phishing message, and security awareness system 206 may create the simulated phishing message or the template for the simulated phishing message are explained in greater detail in conjunction with FIG. 2B.

Further, in some embodiments, the user may delete the message if the message appears to be a potentially malicious, leading to the message being moved to a trash folder or a delete folder of the email account of the user. In an example, email client 220 may remove the message from the user's mailbox. In such a scenario, the message may remain in the trash folder or the delete folder until the message is identified as a threat (malicious phishing message).

Figure 2B:
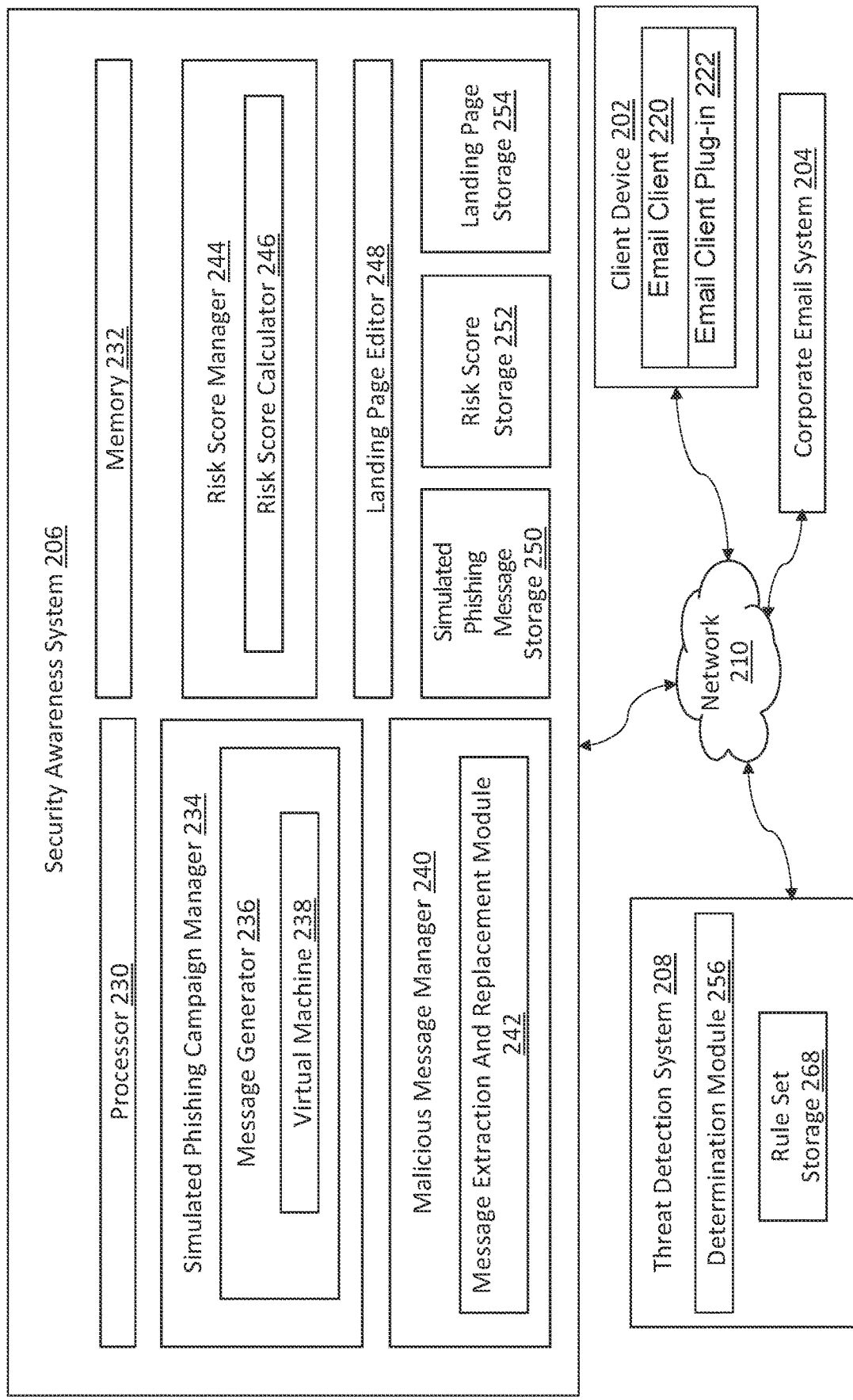
FIG. 2B depicts an implementation of some of the architecture of the system of FIG. 2A for using a reported suspicious message to create a simulated phishing message, according to some embodiments.

FIG. 2B depicts an implementation of some of the architecture of system 200 of FIG. 2A for using a reported suspicious message to create a simulated phishing message, according to some embodiments.

In some embodiments, security awareness system 206 may include processor 230 and memory 232. For example, processor 230 and memory 232 of security awareness system 206 may be CPU 121 and main memory 122 respectively as shown in FIGS. 1C and 1D. Further, security awareness system 206 may include simulated phishing campaign manager 234. In an implementation, simulated phishing campaign manager 234 may be an application or a program that manages various aspects of a simulated phishing attack, for example, tailoring and/or executing a simulated phishing attack. A simulated phishing attack may test readiness of a user to handle phishing attacks such that malicious actions are prevented. For instance, simulated phishing campaign manager 234 may monitor and control timing of various aspects of a simulated phishing attack, may process requests for access to attack results, or may perform other tasks related to the management of a simulated phishing attack.

In some embodiments, simulated phishing campaign manager 234 may include message generator 236 which may comprise a virtual machine 238. Message generator 236 may be an application, service, daemon, routine, or other executable logic for generating messages. The messages generated by message generator 236 may be of any appropriate format. For example, they may be email messages, text messages, messages used by messaging applications such as, e.g., WhatsApp™, or any other type of message. Message type to be used in a particular simulated phishing message may be selected by, for example, simulated phishing campaign manager 234. The messages may be generated in any appropriate manner, e.g. by running an instance of an application that generates the desired message type, such as running e.g. a Gmail® application, Microsoft Outlook™, WhatsApp™, a text messaging application, or any other appropriate application. The messages may be generated by running a messaging application on virtual machine 238 or may be run in any other appropriate environment. The messages may be generated to be in format consistent with specific messaging platforms, for example Outlook 365™, Outlook Web Access (OWA), Webmail™, iOS®, Gmail®, and so on. In an implementation, message generator 236 may be configured to generate simulated phishing messages. The simulated phishing messages may be used in simulated phishing attacks or simulated phishing campaigns.

Referring again to FIG. 2B, in some embodiments, security awareness system 206 may include malicious message manager 240. Malicious message manager 240 may be an application or a program that manages handling of malicious phishing messages. In an example, malicious message manager 240 may manage extraction of malicious phishing messages from client devices of the users. Also, malicious message manager 240 manages message stores and placement of the simulated phishing message into the users' message stores. A message store may be understood as any location where messages (e.g., malicious phishing messages) may be stored. The message store may include an inbox, a junk folder, a spam folder, a trash folder or a delete folder, etc. In an implementation, message extraction and replacement module 242 may be configured to replace malicious phishing messages in the users' mailboxes or other folders with simulated phishing messages. Message extraction and replacement module 242 may be coupled to processor 230 and memory 232. In some embodiments, message extraction and replacement module 242, amongst other modules, may include routines, programs, objects, components, data structures, etc., which may perform particular tasks or implement particular abstract data types. Message extraction and replacement module 242 may also be implemented as, signal processor(s), state machine(s), logic circuitries, and/or any other device or component that manipulate signals based on operational instructions.

In some embodiments, message extraction and replacement module 242 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or, the processing unit may be dedicated to perform the required functions. In some embodiments, message extraction and replacement module 242 may be machine-readable instructions which, when executed by a processor/processing unit, perform any of the desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 232.

According to some embodiments, security awareness system 206 may include risk score manager 244. Risk score manager 244 may be an application or a program that manages risk scores of users of an organization. A risk score of a user may be a representation of vulnerability of the user to a malicious attack. Further, risk score manager 244 may deploy risk score calculator 246 to determine risk scores for the users. Further, security awareness system 206 may include landing page editor 248. In an application, landing page editor 248 may be an application or a program for creation or manipulation of landing pages to facilitate security awareness training of users in an organization. In an example, a landing page may be a web page or an element of web page such as a pop-up which enables provisioning of training materials.

Referring back to FIG. 2B, in some embodiments, security awareness system 206 may comprise simulated phishing message storage 250, risk score storage 252, and landing page storage 254. In an implementation, simulated phishing message storage 250 may store simulated phishing message templates, risk score storage 252 may store risk scores of users of an organization, and landing page storage 254 may store landing page templates. The simulated phishing message templates stored in simulated phishing message storage 250, the risk scores of users stored in risk score storage 252, and the landing page templates stored in landing page storage 254 may be periodically or dynamically updated as required.

In some embodiments, threat detection system 208 may include determination module 256. In an implementation, determination module 256 may be configured to determine whether reported messages are malicious phishing messages. In examples, a security contact point may determine whether reported messages are malicious phishing messages. Determination module 256 may be coupled to processor 230 and memory 232. In some embodiments, determination module 256, amongst other modules, may include routines, programs, objects, components, data structures, etc., which may perform particular tasks or implement particular abstract data types. Determination module 256 may also be implemented as, signal processor(s), state machine(s), logic circuitries, and/or any other device or component that manipulate signals based on operational instructions.

In some embodiments, determination module 256 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or, the processing unit may be dedicated to perform the required functions. In some embodiments, determination module 256 may be machine-readable instructions which, when executed by a processor/processing unit, perform any of the desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. Further, threat detection system 208 may include rule set storage 258. Rule set storage 258 may store one or more rule sets of one or more characteristic detection rules.

In operation, a user of client device 202 may receive a message in his or her mailbox. In an implementation, the user may receive the message from corporate email system 204. In an example, the user may be a technically savvy or a well-informed employee of the organization who has a high level of security awareness.

In some embodiments, on suspecting the message to be potentially malicious, the user may report the message using email client plug-in 222. In an implementation, when the user selects to report, via the PAB button, the message to be potentially malicious, email client plug-in 222 may receive an indication that the user has reported the message received at the user's mailbox or email account as potentially malicious. In response to receiving the indication that the user has reported the message, email client plug-in 222 may cause email client 220 to forward the message (suspicious message) or a copy of the message (suspicious message) to threat detection system 208. In some embodiments, email client 220 or email client plug-in 222 may send a notification to security awareness system 206 that the user has reported the message received at the user's mailbox as potentially malicious. In response, security awareness system 206 may retrieve the message reported by the user from the user's mailbox and forward the message to threat detection system 208.

In some embodiments, on receiving the message, if the user suspects that the message is potentially malicious, the user may delete the message from his or her mailbox, such that the message is moved to a trash folder or a delete folder of an email account of the user. In an example, email client 220 may remove the message from the user's mailbox. In such a scenario, the message may remain in the trash folder or the delete folder until the message is identified as a threat (malicious phishing message).

Further, in some embodiments, if the user suspects that the message is potentially malicious, the user may forward the suspicious message to the security contact point. In an implementation, the security contact point may communicate the suspicious message to threat detection system 208. In some implementations, threat detection system 208 may identify a report of the message being suspicious. Based on identification, threat detection system 208 may retrieve the suspicious message from the security administrator.

According to an implementation, upon receiving a forward of the message identified as potentially malicious, or upon identifying a report of the message being suspicious, or upon identifying the message being suspicious in a message store of one or more users, determination module 256 of threat detection system 208 may process the reported/suspected message to determine whether the message is a malicious phishing message. In an embodiment, determination module 256 may determine that the message is a malicious phishing message using a rule set of one or more characteristic detection rules. The rule set may be compiled and executed against messages that users have reported to be a threat. In some embodiments, one rule set may be compiled per organization. In some examples, one rule set for each part of a message may be compiled per organization. Further, a combination rule may include multiple characteristic detection rules combined via one or more logical operators forming an expression with a binary or "yes/no" result. An example of a characteristic detection rule is a Yet Another Recursive/Ridiculous Acronym (YARA) rule. Each of the characteristic detection rules may include a description of a characteristic based on either a textual or a binary pattern. In some embodiments, for each characteristic detection rule, a tag is generated which has predetermined tag identifier, a combination rule identifier, and an index, and the tags are attached to characteristic detection rules of a rule set before the rule set is compiled.

In some embodiments, determination module 256 may execute the rule set (e.g. compiled rule set) against the message to detect whether the message has any of the characteristics that the characteristic detection rules have in the rule set test. In an implementation, the execution of the compiled rule set returns tags, a name, and metadata for each of the characteristic detection rules in the rule set that matched against the message (such as for which the binary or textual pattern specified by the characteristic detection rule was found in the message). In an implementation, determination module 256 may retrieve the one or more rule sets from rule set storage 258 to compile the one or more rule sets into one or more compiled rule sets.

Based on the identification (using the tags, the name, or the metadata for the characteristic detection rule, or any combination of tags, name and metadata for the characteristic detection rule) of the returned characteristic detection rules, determination module 256 may construct and evaluate a logical expression of each combination rule. In an implementation, the result of the evaluated combination rule against the message allows the classification of the message based on its characteristics. For example, the result may indicate that the message is potentially a threat, or the result may indicate that the message is safe and genuine.

In some implementations, the characteristic detection rules may be grouped and/or compiled into rule sets that are targeted to a specific part of the message only (for example a header of the message, a body of the message, an attachment of the message, or metadata of the message), instead of the entire message, and these compiled rule sets may only be executed against the parts of the message that they apply to.

In some embodiments, in response to the determination that the message is a malicious phishing message, threat detection system 208 may send or forward the malicious phishing message to security awareness system 206. In examples, the malicious phishing message may include malicious elements such as links, attachments, macros, or any other kind of malicious element. In some embodiments, threat detection system 208 may send a notification of the malicious phishing message to security awareness system 206. Further, in some embodiments, threat detection system 208 may send information about the malicious phishing message that enables security awareness system 206 to retrieve the malicious phishing message from corporate email system 204 or from email client 220 associated with client device 202. Examples of the information that threat detection system 208 may send to security awareness system 206 in order to identify the malicious phishing message are provided in Table 1.

TABLE 1

| Agents | Transmission | Content and Structure |
| --- | --- | --- |
| Local part-A user account of an Agent assigned by a mail provider. The local part is identified as alphanumeric characters prior to an @ symbol. This part may identify the user account that was used to transmit the message (for example email). | Message-ID-A unique identifier created by the domain from which the message originated that is embedded within the email header. The message-id is found in received messages and is not present in local messages. The message ID can be used to understand what messages make up a message thread. | Subject-A short string that may identify the topic of the message. The subject line may be blank. The subject may indicate the message purpose. It also may provide a way to sort several messages or identify them as part of a thread. |
| Domain part-A host or domain named used by a DNS to indicate the mail provider that handles the message. The domain part identifies the domain from which the message originated. | Sent-date-Date and time that a message was completed by a creator and/or transmitted by a sender or received by a recipient. The sent date is obtained from the system settings of the sender's machine. There is a potential that the date and time may have been altered, however this may still be useful in terms of identifying a message. | Keywords-Words and phrases that may summarize content of the message. Keywords may be created by threat detection system 208 or by email client 220 or by email client plug-in 222. Keywords may be attached to the message by the person or software application that created it. |
| Domain literal-IP address of the source or destination domain. Domain literal identifies a machine address from which the message originated. | Received date-Date and time that a message was received by recipient's host. Received date does not confirm that the message was downloaded or read by the recipient. | Attachments-If present, an identifier that indicates one or more attachments associated with the message. |

TABLE 1-continued

| Agents | Transmission | Content and Structure |
| --- | --- | --- |
| Display name (if present)-A plain text indication of the Agent's name. Display name identifies the name of the Agent specified for the mail account. | Trace-field-Field that indicates the route that the message took to travel from the sender to the recipient and when it occurred. This is a repeatable value consisting of an optional "Return-Path" field and one or more "Received" fields. The trace fields are external to the control of a sender and the recipient and therefore are more trustworthy than the Sent and Received date for identification or validation. | Message body and associated mark-up. It may be preferable to preserve any message mark up. |
| Relationship-Relationship that the Agent has with the message, e.g. creator, sender, recipient (primary, CC, BCC). This identifies how each agent relates to the message. | | |

In some embodiments, threat detection system 208 may send the exact received message (as received by the user in his or her mailbox) or a version of the received message with the malicious elements modified to make them harmless, or removed, to security awareness system 206. In examples where the malicious elements have been modified such that they are no longer able to cause harm, they may still be referred to in this description as the malicious elements as a way of identifying the relevant part of the message. In response to receiving the message, security awareness system 206 may extract information or identifiers and may associate these with the malicious phishing message. In some embodiments, security awareness system 206 may use the information and/or the identifiers to find instances of the malicious phishing message on corporate email system 204 or email client 220 associated with client device 202. Further, upon locating the instances of the malicious phishing message, security awareness system 206 may create a record or a list of locations of the instances. In some instances, security awareness system 206 may disconnect network access to any of external clients and/or client devices associated with external clients that may have had a copy of the malicious phishing message to prevent the external clients from accessing or being sent any malicious content.

In an implementation, security awareness system 206 may modify, replace, alter, or remove one or more malicious elements of the malicious phishing message to create a simulated phishing message or a template for creating the simulated phishing message. For example, security awareness system 206 may replace the one or more malicious elements of the malicious phishing message with one or more benign elements to create the simulated phishing message. In some embodiments, threat detection system 208 may communicate only the information related to types of exploits in the malicious phishing message to security awareness system 206 instead of communicating the malicious phishing message itself. In some examples, threat detection system 208 may select other exploit types and communicate these exploit types to security awareness system 206 such that security awareness system 206 may include these exploit types in the simulated phishing message or the template for the simulated phishing message.

In an implementation, message generator 236 of security awareness system 206 may be configured to generate the simulated phishing message or the template to create the simulated phishing message based at least on the malicious phishing message received from threat detection system 208. In examples, message generator 236 of security awareness system 206 may be configured to generate the simulated phishing message or the template to create the simulated phishing message based at least on the malicious phishing message received from a security contact point. In an example, where the malicious phishing message does not contain any personalized links or references, message generator 236 may generate a single simulated phishing message for all users of the organization. In some examples, where the malicious phishing message includes specific user references or customized content, message generator 236 may create a template with dynamic elements or content. For example, message generator 236 may create a template which may be customizable to include one of a specific user reference or content. Accordingly, the template could be customized according to a single user or a group of users, such that the simulated phishing message generated with the template is contextually more relevant to the user. In an example, dynamic fields may specify, for example, a user's name, an organization's name, a date, and so forth. Thus, the simulated phishing message displayed to the users may be individually tailored, personalized or customized.

In some embodiments, message generator 236 may examine the malicious phishing message that includes attachments. In an example, these attachments may include files in formats such as ".pdf", ".html", ".zip", ".exe", ".xlsm" or any other format. In an implementation, message generator 236 may modify or remove attachments from the malicious phishing message to create a simulated phishing message. Message generator 236 may replace the attachments (malicious attachments) with another attachments (benign attachments) that may redirect a user to a landing page for security awareness training when the user attempts to either save, open, or run (in the case of an executable) the attachments. In an example, the landing page may be any page (e.g., a web page) which enables provisioning of training materials. In some examples, the attachments may be in a form of documents in formats such as ".doc", ".pdf", ".html", or any other format which include embedded links. In such scenarios, message generator 236 may replace the embedded links with training links that may redirect a user to a landing page. The landing page may include training material for the user that educates the risk in opening the links and precautions in dealing with unknown, untrusted, and suspicious email. In some examples, the attachments may contain macros (for example, a spreadsheet with the extension .xlsm is macro-enabled). Message generator 236 may replace the macros with batch or binary files that, when invoked or executed, may redirect the user such that the user may be provided with appropriate security awareness training.

In scenarios where the malicious phishing message includes one or more malicious links, message generator 236 may identify the malicious links based on Hypertext Reference (HREF) attributes of anchor tags. If an anchor tag does not indicate a non-empty HREF attribute, message generator 236 may identify text within the anchor tag as a link. In some implementations, message generator 236 may also process text that is not found within the anchor tags and search for any sequence of characters that could represent a web address such as text starting with "http://" or "https://" or "www.", or ending with ".com", ".org", or other domain names. In an implementation, message generator 236 may use any other method as is known in the art to find and identify links in the malicious phishing message.

In some embodiments the steps performed by message generator 236 and described herein in identifying, removing or modifying malicious elements may have been performed by threat detection system 208. Threat detection system 208 may perform some or all of these steps prior to sending the reported message to the security awareness system 236.

In some embodiments, upon identifying the links, message generator 236 may modify or replace one or more malicious links of the malicious phishing message to create the simulated phishing message or the template for creating the simulated phishing message to include one or more benign links to training content when interacted with by the user. In an implementation, message generator 236 may create the simulated phishing message based on replacing the one or more malicious links of the malicious phishing message with one or more benign links that, when interacted with, direct the user to training content, for example a landing page hosted by security awareness system 206. The benign links may be made to look the same or very similar to the original links (malicious links) in the malicious phishing message. The manner in which the landing page may be created is described henceforth.

According to an implementation, landing page editor 248 may create a landing page or edit/modify a landing page template to create the landing page. In an implementation, landing page editor 248 may retrieve the landing page template from landing page storage 256. In an example, a landing page may be any page (for example, a web page) which enables provisioning of training materials. In some examples, a landing page may be understood as a page that a user is traversed to if the user fails a simulated phishing attack, that is if the user interacts in some way with the one or more benign elements of the simulated phishing message. In an implementation, landing page editor 248 may add one or more tags to the malicious elements. In an example, the one or more tags may be understood as identifier(s) for the landing page. Further, landing page editor 248 may be configured to modify the number or positions of the tags. In implementations, the tags which classify a landing page may be used for querying and identify the landing page suitable for a given simulated phishing message or template creation.

In some embodiments, once the simulated phishing message is created, malicious message manager 240 may search message stores of all the users in the organization for the malicious phishing message. A message store may be understood as any location where messages (for example, malicious phishing messages) may be stored. The message store may include a mailbox, a junk folder, a spam folder, a trash folder or a delete folder, etc. In an implementation, malicious message manager 240 may search for the malicious phishing message using an Application Program Interface (API). In an example, malicious message manager 240 may search for the malicious phishing message using one or more criteria of the message which are listed, for example, in the Table 1.

In an implementation, upon identification of the malicious phishing message in a message store of a user, message extraction and replacement module 242 may perform retraction of the malicious phishing message. In an example, message extraction and replacement module 242 may perform the retraction of the malicious phishing message based on extracting the malicious phishing message and placing the simulated phishing message into the user's message store. In an example, if the malicious phishing message is identified in a messaging application (such as email client 220) of the user, message extraction and replacement module 242 may cause the malicious phishing message in the messaging application of the user to be replaced with the simulated phishing message.

In some implementations, message extraction and replacement module 242 may replace one or more instances of the malicious phishing message with the simulated phishing message. In some examples, message extraction and replacement module 242 may replace or swap out any instance of the malicious phishing message with the simulated phishing message regardless of whether the malicious phishing message is in the user's junk folder, spam folder, delete folder, or another storage folder on corporate email system 204, on email client 220, or a part of a message archive. In an example, if the malicious phishing message is identified in any of a delete folder or a trash folder of a messaging application of the user, message extraction and replacement module 242 may replace the malicious phishing message with the simulated phishing message. Further, message extraction and replacement module 242 may cause the simulated phishing message to be moved from the delete or the trash folder of the messaging application of the user to an inbox of the messaging application. In some examples, message extraction and replacement module 242 may move the malicious phishing message to a cybersecurity "sandbox" such that Anti-Virus (AV) or Anti Ransomware (AR) system may forensically examine the malicious phishing message.

In some embodiments, criteria used in identifying other instances of the malicious phishing message may include only one of pieces of information of the malicious phishing message. In examples, message extraction and replacement module 242 may use two or more pieces of information about the malicious phishing message to identify other instances of the malicious phishing message. For example, the criteria may include one or more of a subject, a sender, links, a body, a reply-to address, or an attachment. In examples, a process to identify other instances malicious phishing message may be optimized by, for example, a perimeter gateway device storing a cache of messages from a recent time period that makes the searching process faster. The process may be further optimized by hashing and indexing of message data for faster retrieval. In a hashing example, the cache of messages that are stored may be hashed, and the malicious phishing message may also be hashed. Accordingly, when message extraction and replacement module 242 searches for the hash of the malicious phishing message, message extraction and replacement module 242 may easily find the malicious phishing message, for example, if the hash is of a fixed length.

In some implementations some or all of the functions performed by the message extraction and replacement module 242, including but not limited to the searching of message stores of all the users in the organization for the malicious phishing message and the replacement of one or more instances of the malicious phishing message with the simulated phishing message, may be performed by the threat detection system 208.

According to some embodiments, security awareness system 206 may execute a simulated phishing attack or a simulated phishing campaign based on the reported malicious phishing message. The simulated phishing campaign may, for example, target a group of users, such as employees of a business unit of the organization for imparting cybersecurity awareness. The simulated phishing campaign may be carried out for specific purposes including giving enhanced training to more vulnerable groups in the organization. In an example, the security awareness system 208 may initiate the simulated phishing campaign based on communicating the simulated phishing message to one or more devices of one or more users of the organization. In an example, message generator 236 may send the simulated phishing message to one or more devices of one or more users of the organization. Further, in an example, the simulated phishing message may be placed in a queue for sending to the users as part of a simulated phishing campaign, where the users are part of a group. In examples, message generator 236 may also send the simulated phishing message to users who have not received the malicious phishing message. Further, in some examples, message generator 236 may send the simulated phishing message to users who have already received the malicious phishing message (for example, users that have received but not opened or otherwise interacted with the malicious phishing message). In an example, message generator 236 may send the simulated phishing message to one or more devices of the users with poor risk scores or users with a risk score that is below a pre-determined threshold (due to lack of cyber security awareness). The manner in which the risk scores of the users may be calculated is described henceforth.

According to an implementation, risk score manager 244 may manage the risk scores of the users of the organization. Further, risk score manager 244 may determine/establish a threshold that may be used to assess security awareness of the users. In an implementation, risk score calculator 246 may be configured to calculate risk scores for users of the organization. A risk score for a user quantifies a cybersecurity risk that the user poses to an organization. In other words, a risk score of a user may be a representation of vulnerability of the user to a malicious attack. In an example, a risk score may be represented by a number between 0 and 1, where 0 represents a low risk and 1 represents a high risk. In one example, a user with a higher risk score presents a greater risk to the organization and a user with a lower risk score presents a lower risk to the organization. In an implementation, risk score calculator 246 may calculate the risk scores for the users based on machine-learned predictive analytics.

In some embodiments, risk score calculator 246 may calculate more than one risk score for a given user. A non-exhaustive list of examples of individual risk scores include a personal risk score, an access risk score, a vulnerability risk score, a job risk score, a situational risk score, and an exposure risk score. Other examples of the individual risk scores may be risk scores that are based on email activities of the user, web browsing activities of the user, and phone (mobile or landline) use activities of the user. In an example, the personal risk score may represent the user's propensity to click on a malicious phishing message (i.e., the likeliness that the user will fall for a phishing attack).

In an implementation, risk score calculator 246 may calculate the personal risk score for the user based on:
 a) the user's past history of reactions to either real or simulated phishing messages,
 b) a number of training related to cybersecurity attacks the user has completed over a period of time,
 c) a number of simulated phishing campaigns the user has completed over a period of time,
 d) how strong the user's password choices are,
 e) how often the user changes his or her password, and/or
 f) different factors related to the user's actions.

Further, the access risk score may represent the user's propensity to be ensnared in phishing attacks related to access controls. Higher access risk score indicates detrimental outcomes if the user accessed/interacted with a malicious phishing attack.

In an implementation, risk score calculator 246 may calculate the access risk score for the user based on:
 a) how much administrative access the user has to organization's systems,
 b) how much access the user has to sensitive business or financial information, and/or
 c) the user's permission levels.

In an example, an IT professional would have a higher access risk score because they are able to access and configure multiple of computer systems of the organization.

The vulnerability risk score may represent a likelihood the user is to be targeted by an attacker. In an implementation, risk score calculator 246 may calculate the vulnerability risk score for the user based on:
 a) how much social media presence the user has, or how many online accounts the user maintains, and/or
 b) user's attack surface.

Further, the job risk score may represent a likelihood the user is to be targeted by an attacker due to the role/position of the user. The situational risk score may represent a likelihood the user is to be targeted as the user may frequently work remotely or from home. The exposure risk score may represent a likelihood the user is to be targeted as the user may frequently receive malicious phishing messages.

In an example, a user's attack surface may be understood as a total sum of vulnerabilities that can be exploited to carry out a security attack. A user may have a physical and/or a digital attack surface. A digital attack surface may include all vulnerabilities due to connected hardware and software that are available to unauthenticated users (attackers). Further, a physical attack surface may include all vulnerabilities due to all endpoint devices, including desktop systems, laptops, mobile devices, etc. that are available to unauthenticated users.

In an implementation, risk score calculator 246 may calculate the job risk score of the user based on a designation/position of the user in the organization. In an example, a senior level employee of the organization may be more likely to be targeted as that employee is better known than a junior level employee of the organization; and hence, the senior level employee may have a higher job risk score. Further, in an implementation, risk score calculator 246 may calculate the situational risk score of the user based on the user's situation that might increase risk. In an example, risk score calculator 246 may calculate the situational risk score of the user based on:

a) location of the user's organization,
b) industry to which the user's organization belong, and/or
c) whether the user works from home or in an office setting.

In an example, the situational risk score may be higher for a user because of the industry that the user's organization is in. In some examples, the situational risk score for a user individual may be higher because of the region in the world where the user's organization is located. Further, in some examples, the situational risk score for a user may be higher if the user works from home as opposed to working in an office setting. In an implementation, risk score calculator 246 may further calculate the exposure risk score of the user based on a frequency of malicious phishing messages that the user receives in a given period of time.

In some embodiments, risk score calculator 246 may further calculate a combined risk score for each user of the organization based on a combination of the individual risk scores of the user. In an example, the combined risk score may reflect a weighted combination of the individual risk scores. Risk score calculator 246 may assign a weight to each risk score. In an implementation, risk score calculator 246 may further calculate a combined risk score for a user using equation (1) or equation (2) as provided below:

$$R_{TOT} = \frac{\omega_P \cdot P + \omega_A \cdot A + \omega_V \cdot V + \omega_J \cdot J + \omega_S \cdot S + \omega_E \cdot E}{NUM_{Risk\ factors}} \quad (1)$$

$$R_{TOT} = \omega_P \cdot P \cdot \omega_A \cdot A \cdot \omega_V \cdot V \cdot \omega_J \cdot J \cdot \omega_S \cdot S \cdot \omega_E \cdot E \quad (2)$$

In the above equations (1) and (2), $R_{TOT}$ represents the combined risk score, P represents a risk factor "personal risk score", A represents a risk factor "access risk score", V represents a risk factor "vulnerability risk score", J represents a risk factor "job risk score", S represents a risk factor "Situational risk score", E represents a risk factor "exposure risk score", cop represents a weight assigned to the risk factor "personal risk score", $\omega_A$ represents a weight assigned to the risk factor "access risk score", $\omega_V$ represents a weight assigned to the risk factor "vulnerability risk score", $\omega_S$ represents a weight assigned to the risk factor "situational risk score", and $\omega_E$ represents a weight assigned to the risk factor "exposure risk score", and $NUM_{Risk\ factors}$ represents a total number of risk factors (individual risk score).

In an implementation, risk score calculator 246 may calculate a composite risk score for a user based on combining individual risk scores of the user in an aggregated manner. In some examples, if a user accurately identifies and reports a new phishing attack (zero-day attack), the risk score of the user may go down. Other ways to determine risk scores of the users are possible and whilst not explicitly discussed, are contemplated herein.

Further, risk score manager 244 may define rewards for users who report the malicious phishing messages within a short span of receiving. An intent of a reward may be to incentivize the user to repeat the reporting of suspicious or malicious phishing messages. The reward may also serve the purpose of motivating other users to spot and report suspicious or malicious phishing messages. In some examples, a user who may have initially reported the new phishing attack may earn an award or a reward. Risk score manager 244 may have a reward program to recognize the users demonstrating an alert behavior towards suspicious/malicious phishing messages. Also, the risk scores of the users are decreased in response to reporting the suspicious or potentially malicious message, or the simulated phishing message itself. Similarly, the risk scores of the users are increased in response to the users interacting with the potentially malicious message and the simulated phishing messages, as it would indicate a gap in security awareness levels.

According to some embodiments, users who interact with the simulated phishing messages are immediately provided with training on the new phishing attack. In an implementation, on receiving the simulated phishing message, if a user interacts with the one or more benign elements of the simulated phishing message in any way, the user may be traversed to (or presented with) a specific landing page. For example, the user may be traversed to the landing page when the user clicks on one or more benign links in the simulated phishing message or on a benign link in an attachment of the simulated phishing message. In some implementations, the link may include the landing page that embeds a copy of the simulated phishing message. In examples, the copy of the simulated phishing message may include one or more flags at a site of malicious traps, such as Uniform Resource Locators (URLs). The landing page may alert the user that the user has failed a simulated phishing test and provide general or specific learning materials to the user.

In an example, the landing page may be any mechanism by which a user is provided a training that is relevant to the specific phishing attack (such as a zero-day attack). In an example, the landing page may be a web page which enables provisioning of training materials. In some examples, the landing page may be a pop-up message. A pop-up message shall be understood to refer to the appearance of graphical or textual content on a display. In examples, the training material or the learning material may be presented on the display as part of, or bounded within, a "window" or a user interface element or a dialogue box. Although other known examples and implementations of pop-ups are contemplated herein, these need not be described in full within this disclosure. In an example, the landing page may be designed and configured to communicate any one or more user interactions or related events to corporate email system 204 for data collection. Further, the landing page may be designed and configured to communicate any one or more data items collected by corporate email system 204 for data collection.

In an implementation, a user may fail a simulated phishing test in many different ways, which collectively are referred to as failure modes. A non-exhaustive list of failure modes is presented in Table 2 (provided below). For example, any of the failure modes presented in the Table 2 could result in the user being traversed to the landing page.

TABLE 2

| Exploit | Failure Mode |
| --- | --- |
| Benign link(s) in a simulated phishing message | Clicking on the link |
| | Hovering over the link |
| | Copying the link and pasting it into a browser |
| Benign attachment(s) to a simulated phishing message | Opening the attachment |
| | Downloading the attachment |
| | Saving the attachment |
| | Attaching the attachment to a new message (for example email) |
| | Creating a copy of the attachment |
| | Executing the attachment (where the attachment is an executable file) |
| Benign macro(s) | Executing the macro |

Other example actions performed relating to the simulated phishing message that result in the user being traversed to the landing page that are not described herein are contemplated herein.

Accordingly, the simulated phishing message may serve a purpose of training for the users of the organization to recognize the new phishing attack (zero-day attack), and also to gauge the security awareness of the users who interact with the benign elements of the simulated phishing message for further training. In examples, successful reporting of the simulated phishing message that has been developed using an actual phishing attack message (that was reported by the well-informed user) allows other users in the organization to be specifically trained to recognize the new phishing attack. As a result, the organization is effectively inoculated against the threat of the new phishing attack and a risk of damage to the organization is minimized.

The simulated phishing message may serve multiple purposes: training the users on zero-day attacks by proactive introduction of neutralized phishing messages, analyzing the response of the users to the simulated phishing message to determine security awareness levels of the users, identifying gaps in security awareness levels of the users and training the users to bridge the gaps in the security awareness levels.

Figure 3:
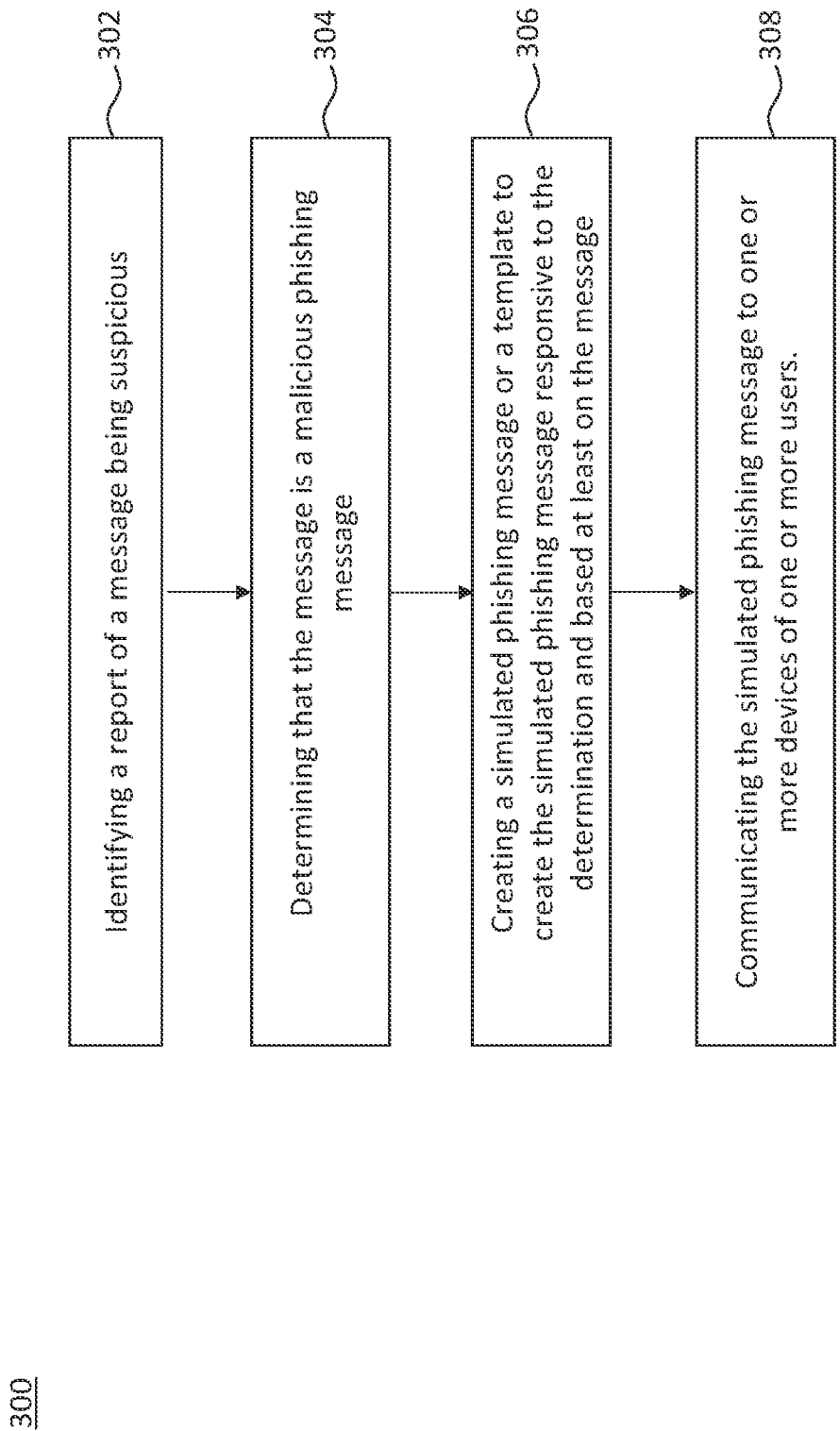
FIG. 3 depicts a flow chart for using a reported suspicious message to create a simulated phishing message, according to some embodiments.

FIG. 3 depicts a flow chart 300 for using a reported suspicious message to create a simulated phishing message, according to some embodiments.

Step 302 includes identifying a report of a message being suspicious. In some embodiments, security awareness system 206 may identify a report of a message being suspicious. In an implementation, security awareness system 206 may receive an indication from client device 202 of a user and/or threat detection system 208 that the user has reported the message received at the user's mailbox as a suspicious message. In an example, the user may be a technically savvy or a well-informed employee of an organization who has a high level of security awareness.

Step 304 includes determining that the message is a malicious phishing message. In some embodiments, security awareness system 206 may determine that the message is a malicious phishing message using a rule set of one or more characteristic detection rules.

Step 306 includes creating a simulated phishing message or a template to create the simulated phishing message responsive to the determination and based at least on the message. In some embodiments, security awareness system 206 may create a simulated phishing message or a template to create the simulated phishing message responsive to the determination and based at least on the message. In an implementation, security awareness system 206 may modify, replace, alter, or remove one or more malicious elements of the malicious phishing message to create the simulated phishing message or the template for the simulated phishing message. In some examples, the template for the simulated phishing message may be used to generate the simulated phishing message that may be customized and contextualized for a specific user, a group of users, a specific industry that an organization operates in, a specific geographic location of the organization, a size of the organization, and so on.

Step 308 includes communicating the simulated phishing message to one or more devices of one or more users. In some embodiments, security awareness system 206 may communicate the simulated phishing message to the one or more devices of the one or more users of the organization. In an example, the simulated phishing message may be placed in a queue for sending to the one or more devices of the users as part of a simulated phishing campaign, where the users are part of a group.

Although it has been described that the steps 302 and 304 are performed by security awareness system 206, in some embodiments, the steps 302 and 304 may be performed by threat detection system 208.

Figure 4:
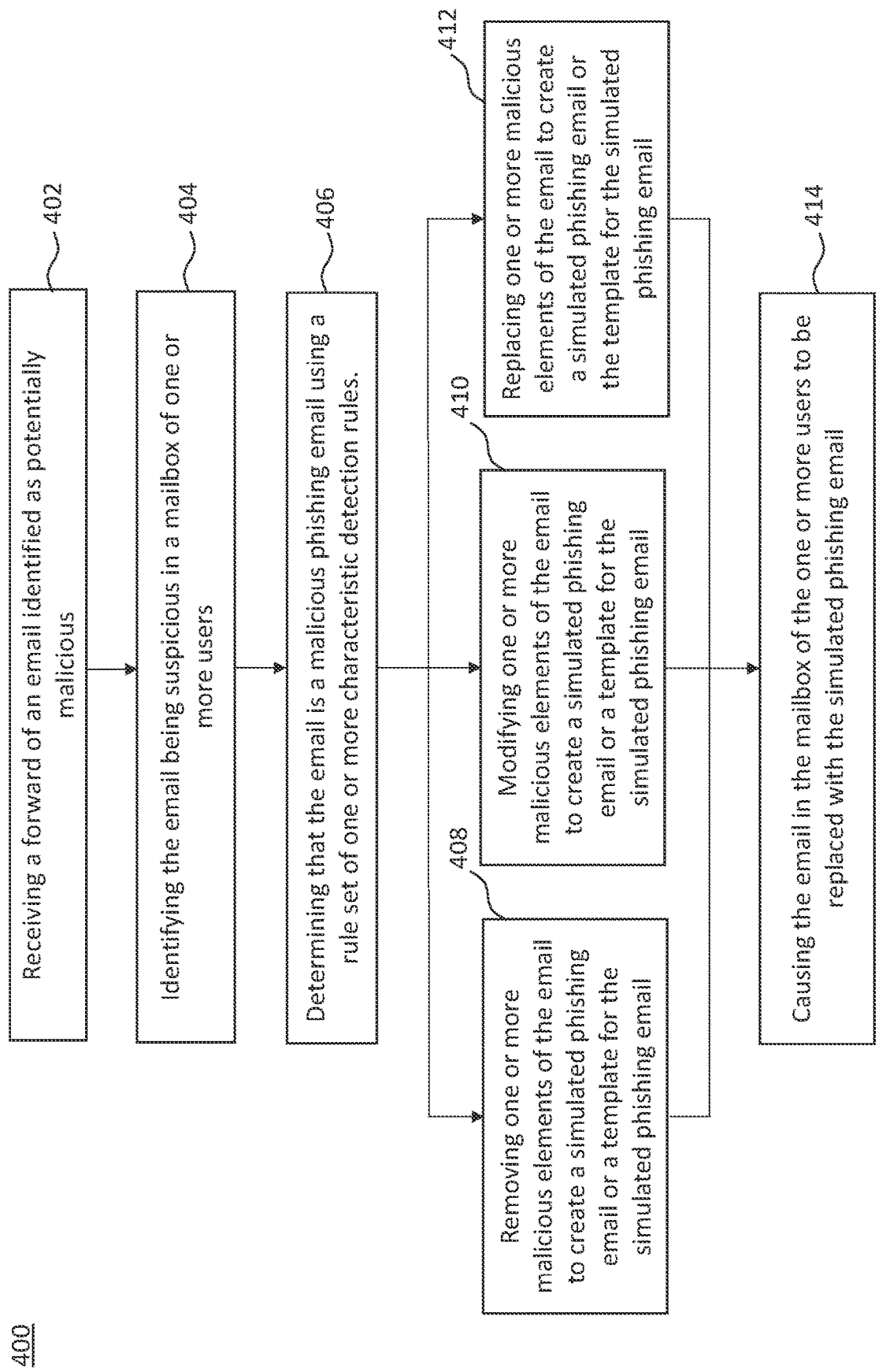
FIG. 4 depicts a flow chart for creating a simulated phishing email and replacing the suspicious email with the simulated phishing email, according to some embodiments.

FIG. 4 depicts a flow chart for creating a simulated phishing email and replacing a suspicious email with the simulated phishing email, according to some embodiments.

Step 402 includes receiving a forward of an email (or a message) identified as potentially malicious. In an implementation, security awareness system 206 may receive a forward of the email identified as potentially malicious. In an example, security awareness system 206 may receive the forward of the email from threat detection system 208.

Step 404 includes identifying the email being suspicious in a mailbox of one or more users. In some embodiments, security awareness system 206 may search a mailbox of the one or more users of an organization for the suspicious email.

Step 406 includes determining that the email is a malicious phishing email (or a malicious phishing message) using a rule set of one or more characteristic detection rules. In some embodiments, on identifying the email being suspicious in the mailbox of the one or more users, security awareness system 206 may determine that the email is a malicious phishing email. In an example, security awareness system 206 may determine that the email is a malicious phishing email using the rule set of one or more characteristic detection rules.

Although it has been described that the steps 402, 404, and 406 are performed by security awareness system 206, in some embodiments, the steps 402, 404, and 406 may be performed by threat detection system 208.

Referring again to FIG. 4, step 408 includes removing one or more malicious elements of the email (malicious phishing email) to create a simulated phishing email or a template for creating the simulated phishing email. In an example, the one or more malicious elements of the email may include one or more of a Uniform Resource Locator (URL), an attachment, a macro, etc. In some embodiments, security awareness system 206 may remove an attachment (malicious attachment), URL, macros, etc., from the email to create the simulated phishing message or the template for the simulated phishing email.

Step 410 includes modifying one or more malicious elements of the email (malicious phishing email) to create a simulated phishing email or a template for the simulated phishing email. In some embodiments, security awareness system 206 may modify the one or more malicious elements of the email to create the simulated phishing email or the template for creating the simulated phishing email. For example, security awareness system 206 may modify one or more links (malicious links) of the email to create the simulated phishing email or the template for the simulated phishing email to include one or more links (benign links) to training content via a landing page when interacted with by a user.

Step 412 includes replacing one or more malicious elements of the email (malicious phishing email) to create a simulated phishing email or the template for the simulated phishing email. In some embodiments, security awareness system 206 may create the simulated phishing email based on replacing the one or more malicious elements (for example, malicious links) of the email with one or more benign elements (for example, benign links) that, when interacted with, direct a user to training content.

Although it has been described that security awareness system 206 performs all the three steps 408, 410, and 412, in some embodiments, security awareness system 206 may perform any one or two of the three steps 408, 410, and 412. Also, although steps 408, 410 and 412 are shown in parallel, steps 408, 410, and 412 can be performed in series in a given order or combination of the steps, that is, for example, if the message includes at least two malicious elements, one element may be removed and other element may be modified or replaced with links to training material or benign elements, respectively.

Step 414 includes causing the email (malicious phishing email) in the mailbox of the one or more users to be replaced with the simulated phishing email. In some embodiments, security awareness system 206 may cause the email in the mailbox of the one or more users to be replaced with the simulated phishing email.

Figure 5:
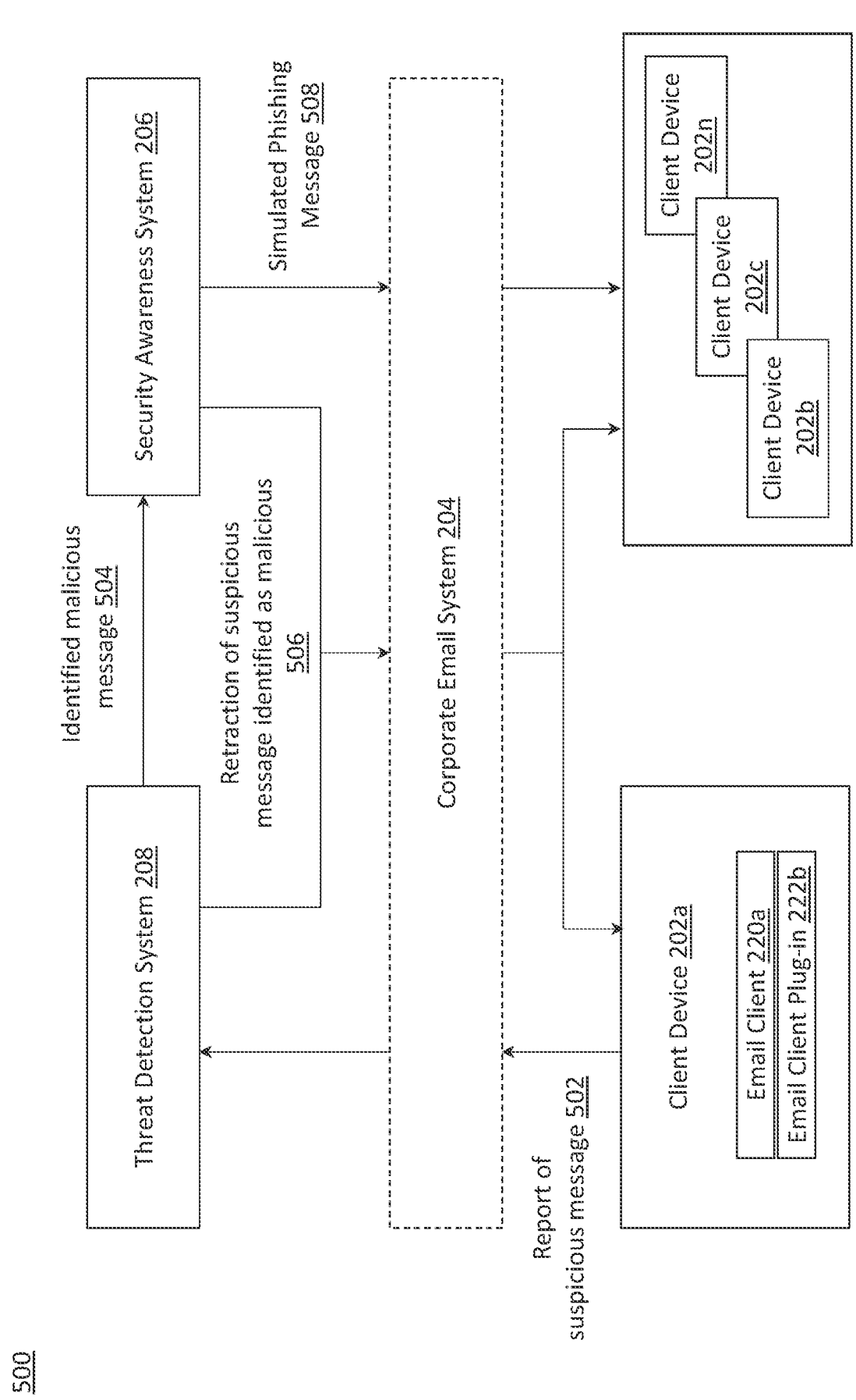
FIG. 5 depicts a flow chart for retracting a reported suspicious message identified as malicious, according to some embodiments.

FIG. 5 depicts a flow chart 500 for retracting a reported suspicious message identified as malicious, according to some embodiments.

At step 502, in some implementations, a user of client device 202a may report a suspicious message. In an example, the user may be a technically savvy or a well-informed employee of an organization who has a high level of security awareness. In an implementation, the user may receive a message in his or her mailbox. On receiving the message, if the user suspects that the message is potentially malicious, the user may report the message using email client plug-in 222a. In an implementation, email client plug-in 222 may provide a User Interface (UI) element such as the PAB in email client 220a of client device 202a. In an example, when the user receives the message and the user suspects that the message is potentially malicious, then the user may click on the UI element using, for example, a mouse pointer to report the message.

In an implementation, when the user selects to report, via the UI element, the message, email client plug-in 222 may receive an indication that the user has reported the message received at the user's mailbox. In response to receiving the indication that the user has reported the message, email client plug-in 222 may cause email client 220 to forward the message (suspicious message) to threat detection system 208 for identifying whether the message is a malicious message (for example, malicious phishing message). In an example, threat detection system 208 may receive the suspicious message from client device 202a directly via a network (not shown). Optionally, threat detection system 208 may receive the suspicious message from client device 202a through corporate email system 204 (as shown in FIG. 5).

At step 504, in some implementations, on identifying the message received from client device 202a to be malicious (malicious phishing message), threat detection system 208 may send the identified malicious message to security awareness system 206. In an implementation, threat detection platform 208 may identity that the message is a malicious message using a rule set of one or more characteristic detection rules. In an example, the malicious message may include one or more malicious elements, such as one or more of a Uniform Resource Locator (URL), an attachment, a macro, etc.

In some embodiments, on receiving the identified malicious message, security awareness system 206 may modify, replace, alter, or remove the one or more malicious elements of the malicious message to create a simulated phishing message. For example, security awareness system 206 may replace the one or more malicious elements of the message with one or more benign elements to create the simulated phishing message.

At step 506, in some implementations, security awareness system 206 may initiate (or cause) retraction of the suspicious message identified as malicious from the mailboxes of one or more users of the organization. In examples, the security contact point may initiate (or cause) retraction of the suspicious message identified as malicious from the mailboxes of one or more users of the organization.

At step 508, in some implementations, simulated awareness system 206 may communicate the simulated phishing message to one or more devices (for example client devices 202b-202n) of one or more users of the organization. In some embodiments, simulated awareness system 206 may also send the simulated phishing message to the one or more devices of the users who have not received a malicious phishing message. In some embodiments, simulated awareness system 206 may send the simulated phishing message to one or more devices of the one or more users who have received the malicious phishing message. In some examples, simulated awareness system 206 may send the simulated phishing message to the one or more devices of all the users of the organization.

According to some embodiments, users who interact with the simulated phishing message are immediately provided with security awareness training which may or may not include training on the malicious phishing attack (new phishing attack or zero-day attack). In an implementation, simulated awareness system 206 may communicate the simulated phishing message to client devices 202b-202n directly via a network (not shown). In some implementations, simulated awareness system 206 may communicate the simulated phishing message to client devices 202b-202n through corporate email system 204 (as shown in FIG. 5).

Although the steps 506 and 508 are shown to be two different steps (executed independently), in some embodiments the steps 506 and 508 may be executed simultaneously, wherein simulated awareness system 206 may initiate the retraction of the suspicious message based on extracting the malicious phishing message from a mailbox of a user and placing the simulated phishing message into the mailbox of the user. In an implementation, simulated awareness system 206 may replace the malicious phishing message with the simulated phishing message.

In some implementations, threat detection system 208 may initiate the retraction of the suspicious message identified as malicious. In such scenario, threat detection system 208 may receive the simulated phishing message from simulated awareness system 206. On receiving the simulated phishing message, threat detection system 208 may initiate the retraction of the suspicious message identified as malicious.

Although various embodiments describe managing phishing attacks and training users (who may be one or more of employees, members, or contractors) of the organization, the embodiments can be applied for users outside the organization. One non-limiting example can be users of a social network. In examples, the users may be account holders and not employees, members or contractors of the social network. Recently, social networks such as Instagram®, Facebook® and Twitter® are being increasingly targeted with the phishing attacks. The phishing attack mostly focuses on compromising social media account credentials of users. In particular, the phishing attack deceptively tricks Instagram® users to provide their credentials and other personal information. For instance, the users are sent a phishing email including a link purporting to be from Instagram® informing them of a copyright infringement that they need to address. The users who click on the link are taken to a realistic-looking webpage that informs them that they have an option to appeal the copyright infringement or be blocked after 48 hours. When a user chooses to appeal, the user is asked for his or her Instagram® account details and birthdate which facilitates a phisher to compromise the actual Instagram® account of the user. Various embodiments of the application can be applied to the users of social network. The users may report any suspicious communication from their accounts to a social networking organization. The social networking organization may analyze and determine whether the communication is a phishing attack. Further, the social networking organization may remove, modify and/or replace the malicious content with training and/or benign content. The communication may be sent to the user and other users to educate the users about such phishing attacks. The user who reports a suspicious communication can be suitably rewarded. Another non-limiting examples include users or customers of banks, retail stores, online market places, online service providers and the like, who have online accounts with such entities. The users or customers are likely to encounter phishing attacks and embodiments of the application are applicable for the above examples. Other example implementations of the embodiments in and outside the organization that are not described herein are contemplated herein.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   identifying, by one or more processors, that a message reported as being suspicious is a malicious phishing message;
   modifying, by the one or more processors, one or more malicious elements of the malicious phishing message to include one or more links to training content when interacted with by a user;
   using, by the one or more processors, the modified malicious phishing message as a simulated phishing message to replace the malicious phishing message in one or more message applications; and
   communicating, by the one or more processors, the modified malicious phishing message as the simulated phishing message to one or more message applications.

2. The method of claim 1, further comprising receiving, by the one or more processors, a report of the message as being suspicious from one or more users during a phishing attack.

3. The method of claim 1, further comprising modifying, by the one or more processors, the malicious phishing message by removing a malicious element of the one or more malicious elements from the malicious phishing message.

4. The method of claim 1, further comprising causing, by the one or more processors, the message reported as being suspicious to be replaced in a messaging application of the one or more messaging applications with the modified malicious phishing message.

5. The method of claim 1, further comprising detecting, by the one or more processors using one or more detection rules, that the reported message is malicious.

6. The method of claim 1, further comprising creating, by the one or more processors, a second simulated phishing message based at least on the modified malicious phishing message.

7. The method of claim 1, further comprising creating, by the one or more processors, a template based at least on the modified malicious phishing message.

8. The method of claim 1, further comprising modifying, by the one or more processors, a link of the one or more malicious elements with a benign link.

9. The method of claim 1, further comprising modifying, by the one or more processors, a malicious element of the one or more malicious elements by removing one of an attachment or macro of the malicious phishing message.

10. A system comprising:
    one or more processors, coupled to memory and configured to:
    identify that a message reported as being suspicious is a malicious phishing message;
    modify one or more malicious elements of the malicious phishing message to include one or more links to training content when interacted with by a user; and
    use the modified malicious phishing message as a simulated phishing message to replace the malicious phishing message in one or more message applications; and
    communicate the modified malicious phishing message as the simulated phishing message to one or more message applications.

11. The system of claim 10, wherein the one or more processors are further configured to receive a report of the message as being suspicious from one or more users during a phishing attack.

12. The system of claim 10, wherein the one or more processors are further configured to modify the malicious phishing message by removing a malicious element of the one or more malicious elements from the malicious phishing message.

13. The system of claim 10, wherein the one or more processors are further configured to cause the message reported as being suspicious to be replaced in a messaging application of the one or more messaging applications with the modified malicious phishing message.

14. The system of claim 10, wherein the one or more processors are further configured to detect, using one or more detection rules, that the reported message is malicious.

15. The system of claim 10, wherein the one or more processors are further configured to create a second simulated phishing message based at least on the modified malicious phishing message.

16. The system of claim 10, wherein the one or more processors are further configured to create a template based at least on the modified malicious phishing message.

17. The system of claim 10, wherein the one or more processors are further configured to modify a link of the one or more malicious elements with a benign link.

18. The system of claim 10, wherein the one or more processors are further configured to modify a malicious element of the one or more malicious elements by removing one of an attachment or macro of the malicious phishing message.

* * * * *